US012549902B2

(12) United States Patent
Seefeldt et al.

(10) Patent No.: US 12,549,902 B2
(45) Date of Patent: *Feb. 10, 2026

(54) RENDERING AUDIO OVER MULTIPLE SPEAKERS WITH MULTIPLE ACTIVATION CRITERIA

(71) Applicants: Dolby Laboratories Licensing Corporation, San Francisco, CA (US); Dolby International AB, Dublin (IE)

(72) Inventors: Alan J. Seefeldt, Alameda, CA (US); Joshua B. Lando, Mill Valley, CA (US); Daniel Arteaga, Barcelona (ES)

(73) Assignees: Dolby Laboratories Licensing Corporation, San Francisco, CA (US); Dolby International AB, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 18/637,051

(22) Filed: Apr. 16, 2024

(65) Prior Publication Data

US 2024/0267679 A1 Aug. 8, 2024

Related U.S. Application Data

(63) Continuation of application No. 17/630,910, filed as application No. PCT/US2020/043631 on Jul. 25, 2020, now Pat. No. 12,003,933.

(Continued)

(30) Foreign Application Priority Data

Jul. 30, 2019 (ES) ................................ ES201930702

(51) Int. Cl.

*H04R 5/04* (2006.01)
*H04R 29/00* (2006.01)

(52) U.S. Cl.

CPC ............. *H04R 5/04* (2013.01); *H04R 29/001* (2013.01); *H04R 2400/01* (2013.01); *H04R 2430/20* (2013.01); *H04S 2400/15* (2013.01)

(58) Field of Classification Search

CPC .. H04S 2420/01; H04S 2400/01; H04S 7/303; H04S 7/302; H04S 7/00;

(Continued)

(56) References Cited

U.S. PATENT DOCUMENTS

2014/0240447 A1* 8/2014 Cartwright ............ H04M 3/569 348/14.09
2015/0131966 A1 5/2015 Zurek (Continued)

FOREIGN PATENT DOCUMENTS

CN 109791193 A 5/2019
CN 107148782 B 6/2020

(Continued)

*Primary Examiner* — Norman Yu

(57) ABSTRACT

Methods for rendering audio for playback by two or more speakers are disclosed. The audio includes one or more audio signals, each with an associated intended perceived spatial position. Relative activation of the speakers may be a cost function of a model of perceived spatial position of the audio signals when played back over the speakers, a measure of proximity of the intended perceived spatial position of the audio signals to positions of the speakers, and one or more additional dynamically configurable functions. The dynamically configurable functions may be based on at least one or more properties of the audio signals, one or more properties of the set of speakers and/or one or more external inputs.

19 Claims, 13 Drawing Sheets

Related U.S. Application Data

(60) Provisional application No. 62/705,410, filed on Jun. 25, 2020, provisional application No. 62/971,421, filed on Feb. 7, 2020.

(58) Field of Classification Search
CPC .. H04S 2400/03; H04S 7/308; H04S 2400/15; H04R 5/04; H04R 5/02; H04R 3/12; H04R 2205/024; H04R 2420/03; H04R 2420/07; H04R 29/001; H04R 2400/01; H04R 2430/20
USPC ........... 381/300, 56, 1, 103, 334, 98; 700/94
See application file for complete search history.

(56) References Cited

U.S. PATENT DOCUMENTS

| | | | | |
|---|---|---|---|---|
| 2016/0134988 | A1 | 5/2016 | Gorzel | |
| 2016/0150344 | A1* | 5/2016 | Filev | H04S 7/30 455/414.2 |
| 2016/0212559 | A1 | 7/2016 | Mateos Sole | |
| 2016/0269128 | A1* | 9/2016 | Gautama | H04B 11/00 |
| 2017/0012591 | A1 | 1/2017 | Rider | |
| 2017/0125023 | A1 | 5/2017 | Oh | |
| 2017/0280264 | A1* | 9/2017 | Wang | H04S 7/308 |
| 2017/0374465 | A1* | 12/2017 | Family | H04S 7/30 |
| 2018/0115850 | A1* | 4/2018 | De Burgh | H04S 7/303 |
| 2018/0357038 | A1 | 12/2018 | Olivieri | |
| 2019/0124458 | A1 | 4/2019 | Sheen | |
| 2019/0158974 | A1 | 5/2019 | Tsingos | |
| 2019/0166447 | A1 | 5/2019 | Seldess | |
| 2020/0351606 | A1 | 11/2020 | Seefeldt | |

FOREIGN PATENT DOCUMENTS

| | | | |
|---|---|---|---|
| EP | 3209034 | A1 | 8/2017 |
| EP | 3223542 | B1 | 4/2021 |
| GB | 2561844 | A | 10/2018 |
| JP | 2013034107 | A | 2/2013 |
| JP | 2016530792 | A | 9/2016 |
| JP | 2017532898 | A | 11/2017 |
| WO | 2014007724 | A1 | 1/2014 |
| WO | 2016048381 | W | 3/2016 |
| WO | 2016172111 | A1 | 10/2016 |
| WO | 2018064410 | W | 4/2018 |
| WO | WO 2018064410 | * | 4/2018 |
| WO | 2018202324 | A1 | 11/2018 |
| WO | 2019067620 | A1 | 4/2019 |
| WO | 2019089322 | W | 5/2019 |

* cited by examiner

RENDERING AUDIO OVER MULTIPLE SPEAKERS WITH MULTIPLE ACTIVATION CRITERIA

CROSS REFERENCE TO RELATED APPLICATIONS

This application is a continuation of U.S. patent application Ser. No. 17/630,910, filed on Jan. 28, 2022, which is the U.S. national stage of International Patent Application No. PCT/US2020/043631, filed on Jul. 25, 2020, which claims priority to U.S. Provisional Patent Application No. 62/971,421, filed Feb. 7, 2020, to U.S. Provisional Patent Application No. 62/705,410, filed Jun. 25, 2020, and to Spanish Patent Application No. P201930702, filed Jul. 30, 2019, each of which is hereby incorporated by reference in its entirety.

TECHNICAL FIELD

The disclosure pertains to systems and methods for rendering audio for playback by some or all speakers (for example, each activated speaker) of a set of speakers.

BACKGROUND

Audio devices, including but not limited to smart audio devices, have been widely deployed and are becoming common features of many homes. Although existing systems and methods for controlling audio devices provide benefits, improved systems and methods would be desirable.

NOTATION AND NOMENCLATURE

Throughout this disclosure, including in the claims, "speaker" and "loudspeaker" are used synonymously to denote any sound-emitting transducer (or set of transducers) driven by a single speaker feed. A typical set of headphones includes two speakers.

Throughout this disclosure, including in the claims, the expression performing an operation "on" a signal or data (e.g., filtering, scaling, transforming, or applying gain to, the signal or data) is used in a broad sense to denote performing the operation directly on the signal or data, or on a processed version of the signal or data (e.g., on a version of the signal that has undergone preliminary filtering or pre-processing prior to performance of the operation thereon).

Throughout this disclosure including in the claims, the expression "system" is used in a broad sense to denote a device, system, or subsystem. For example, a subsystem that implements a decoder may be referred to as a decoder system, and a system including such a subsystem (e.g., a system that generates X output signals in response to multiple inputs, in which the subsystem generates M of the inputs and the other X-M inputs are received from an external source) may also be referred to as a decoder system.

Throughout this disclosure including in the claims, the term "processor" is used in a broad sense to denote a system or device programmable or otherwise configurable (e.g., with software or firmware) to perform operations on data (e.g., audio, or video or other image data). Examples of processors include a field-programmable gate array (or other configurable integrated circuit or chip set), a digital signal processor programmed and/or otherwise configured to perform pipelined processing on audio or other sound data, a programmable general purpose processor or computer, and a programmable microprocessor chip or chip set.

Throughout this disclosure including in the claims, the term "couples" or "coupled" is used to mean either a direct or indirect connection. Thus, if a first device couples to a second device, that connection may be through a direct connection, or through an indirect connection via other devices and connections.

Herein, we use the expression "smart audio device" to denote a smart device which is either a single purpose audio device or a virtual assistant (e.g., a connected virtual assistant). A single purpose audio device is a device (e.g., a TV or a mobile phone) including or coupled to at least one microphone (and optionally also including or coupled to at least one speaker) and which is designed largely or primarily to achieve a single purpose. Although a TV typically can play (and is thought of as being capable of playing) audio from program material, in most instances a modern TV runs some operating system on which applications run locally, including the application of watching television. Similarly, the audio input and output in a mobile phone may do many things, but these are serviced by the applications running on the phone. In this sense, a single purpose audio device having speaker(s) and microphone(s) is often configured to run a local application and/or service to use the speaker(s) and microphone(s) directly. Some single purpose audio devices may be configured to group together to achieve playing of audio over a zone or user configured area.

A virtual assistant (e.g., a connected virtual assistant) is a device (e.g., a smart speaker or voice assistant integrated device) including or coupled to at least one microphone (and optionally also including or coupled to at least one speaker) and which may provide an ability to utilize multiple devices (distinct from the virtual assistant) for applications that are in a sense cloud enabled or otherwise not implemented in or on the virtual assistant itself. Virtual assistants may sometimes work together, e.g., in a discrete and conditionally defined way. For example, two or more virtual assistants may work together in the sense that one of them, for example, the one which is most confident that it has heard a wakeword, responds to the word. The connected devices may form a sort of constellation, which may be managed by one main application which may be (or implement) a virtual assistant.

Herein, "wakeword" is used in a broad sense to denote any sound (e.g., a word uttered by a human, or some other sound), where a smart audio device is configured to awake in response to detection of ("hearing") the sound (using at least one microphone included in or coupled to the smart audio device, or at least one other microphone). In this context, to "awake" denotes that the device enters a state in which it awaits (i.e., is listening for) a sound command. In some instances, what may be referred to herein as a "wakeword" may include more than one word, e.g., a phrase.

Herein, the expression "wakeword detector" denotes a device configured (or software that includes instructions for configuring a device) to search continuously for alignment between real-time sound (e.g., speech) features and a trained model. Typically, a wakeword event is triggered whenever it is determined by a wakeword detector that the probability that a wakeword has been detected exceeds a predefined threshold. For example, the threshold may be a predetermined threshold which is tuned to give a good compromise between rates of false acceptance and false rejection. Following a wakeword event, a device might enter a state (which may be referred to as an "awakened" state or a state of "attentiveness") in which it listens for a command and passes on a received command to a larger, more computationally-intensive recognizer.

SUMMARY

Some embodiments are methods for rendering of audio for playback by at least one (e.g., all or some) of the smart audio devices of a set of smart audio devices, or for playback by at least one (e.g., all or some) of the speakers of a set of speakers. The rendering may include minimization of a cost function, where the cost function includes at least one dynamic (e.g., dynamically configurable) speaker activation term. Including dynamically configurable term(s) with the activation penalty allows spatial rendering to be modified in response to numerous contemplated controls. Examples of a dynamic speaker activation term include (but are not limited to):

- Proximity of speakers to one or more listeners;
- Proximity of speakers to an attracting or repelling force;
- Audibility of the speakers with respect to some location (e.g., listener position, or baby room);
- Capability of the speakers (frequency response and distortion);
- Synchronization of the speakers with respect to other speakers;
- Wakeword performance; and/or
- Echo canceller performance.

Minimization of the cost function (including at least one dynamic speaker activation term) may result in deactivation of at least one of the speakers (in the sense that each such speaker does not play the relevant audio content) and activation of at least one of the speakers (in the sense that each such speaker plays at least some of the rendered audio content). The dynamic speaker activation term(s) may enable at least one of a variety of behaviors, including warping the spatial presentation of the audio away from a particular smart audio device so that its microphone can better hear a talker or so that a secondary audio stream may be better heard from speaker(s) of the smart audio device.

Some disclosed implementations include a system configured (e.g., programmed) to perform any embodiment of the disclosed method or steps thereof, and a tangible, non-transitory, computer readable medium which implements non-transitory storage of data (for example, a disc or other tangible storage medium) which stores code for performing (e.g., code executable to perform) any embodiment of the disclosed method or steps thereof. For example, embodiments of the disclosed system can be or include a programmable general purpose processor, digital signal processor, or microprocessor, programmed with software or firmware and/or otherwise configured to perform any of a variety of operations on data, including an embodiment of the disclosed method or steps thereof. Such a general purpose processor may be or include a computer system including an input device, a memory, and a processing subsystem that is programmed (and/or otherwise configured) to perform an embodiment of the disclosed method (or steps thereof) in response to data asserted thereto.

At least some aspects of the present disclosure may be implemented via methods, such as audio processing methods. In some instances, the methods may be implemented, at least in part, by a control system such as those disclosed herein. Some such methods involve receiving, by a control system and via an interface system, audio data. In some examples, the audio data includes one or more audio signals and associated spatial data. According to some examples, the spatial data indicates an intended perceived spatial position corresponding to an audio signal.

Some such methods involve rendering, by the control system, the audio data for reproduction via a set of loudspeakers of an environment, to produce rendered audio signals. In some examples, rendering each of the one or more audio signals included in the audio data involves determining relative activation of a set of loudspeakers in an environment by optimizing a cost that is a function of the following: a model of perceived spatial position of the audio signal played when played back over the set of loudspeakers in the environment; a measure of proximity of the intended perceived spatial position of the audio signal to a position of each loudspeaker of the set of loudspeakers; and one or more additional dynamically configurable functions.

According to some examples, the one or more additional dynamically configurable functions are based on one or more of the following: proximity of loudspeakers to one or more listeners; proximity of loudspeakers to an attracting force position, wherein an attracting force is a factor that favors relatively higher activation of loudspeakers in closer proximity to the attracting force position; proximity of loudspeakers to a repelling force position, wherein a repelling force is a factor that favors relatively lower activation of loudspeakers in closer proximity to the repelling force position; capabilities of each loudspeaker relative to other loudspeakers in the environment; synchronization of the loudspeakers with respect to other loudspeakers; wakeword performance; and/or echo canceller performance.

Some such methods involve providing, via the interface system, the rendered audio signals to at least some loudspeakers of the set of loudspeakers of the environment. Some such methods involve reproduction of the rendered audio signals by at least some loudspeakers of the set of loudspeakers.

According to some implementations, the model of perceived spatial position may produce a binaural response corresponding to an audio object position at the left and right cars of a listener. In some examples, the model of perceived spatial position may place the perceived spatial position of an audio signal playing from a set of loudspeakers at a center of mass of the set of loudspeakers' positions weighted by the loudspeaker's associated activating gains. In some such examples, the model of perceived spatial position also may produce a binaural response corresponding to an audio object position at the left and right cars of a listener.

In some instances, the one or more additional dynamically configurable functions may be based, at least in part, on a level of the one or more audio signals. In some examples, the one or more additional dynamically configurable functions may be based, at least in part, on a spectrum of the one or more audio signals.

According to some implementations, the one or more additional dynamically configurable functions may be based, at least in part, on a location of each of the loudspeakers in the environment. In some instances, the capabilities of each loudspeaker may include one or more of frequency response, playback level limits or parameters of one or more loudspeaker dynamics processing algorithms. In some examples, the one or more additional dynamically configurable functions may be based, at least in part, on a measurement or estimate of acoustic transmission from each loudspeaker to the other loudspeakers.

According to some examples, the one or more additional dynamically configurable functions may be based, at least in part, on a location or locations of one or more people in the environment. In some such examples, the one or more additional dynamically configurable functions may be based, at least in part, on a measurement or estimate of acoustic transmission from each loudspeaker to the location or locations of the one or more people.

In some examples, the one or more additional dynamically configurable functions may be based, at least in part, on an object location of one or more non-loudspeaker objects in the environment. In some such examples, the one or more additional dynamically configurable functions may be based, at least in part, on a measurement or estimate of acoustic transmission from each loudspeaker to the object location.

In some instances, the one or more additional dynamically configurable functions may be based, at least in part, on an estimate of acoustic transmission from each speaker to one or more landmarks, areas or zones of the environment. According to some examples, the intended perceived spatial position may correspond to at least one of a channel of a channel-based audio format or positional metadata.

Some or all of the operations, functions and/or methods described herein may be performed by one or more devices according to instructions (e.g., software) stored on one or more non-transitory media. Such non-transitory media may include one or more memory devices such as those described herein, including but not limited to one or more random access memory (RAM) devices, read-only memory (ROM) devices, etc. Accordingly, some innovative aspects of the subject matter described in this disclosure can be implemented in one or more non-transitory media having software stored thereon.

For example, the software may include instructions for controlling one or more devices to perform a method that involves receiving, by a control system and via an interface system, audio data. In some examples, the audio data includes one or more audio signals and associated spatial data. According to some examples, the spatial data indicates an intended perceived spatial position corresponding to an audio signal.

Some such methods involve rendering, by the control system, the audio data for reproduction via a set of loudspeakers of an environment, to produce rendered audio signals. In some examples, rendering each of the one or more audio signals included in the audio data involves determining relative activation of a set of loudspeakers in an environment by optimizing a cost that is a function of the following: a model of perceived spatial position of the audio signal played when played back over the set of loudspeakers in the environment; a measure of proximity of the intended perceived spatial position of the audio signal to a position of each loudspeaker of the set of loudspeakers; and one or more additional dynamically configurable functions.

According to some examples, the one or more additional dynamically configurable functions are based on one or more of the following: proximity of loudspeakers to one or more listeners; proximity of loudspeakers to an attracting force position, wherein an attracting force is a factor that favors relatively higher activation of loudspeakers in closer proximity to the attracting force position; proximity of loudspeakers to a repelling force position, wherein a repelling force is a factor that favors relatively lower activation of loudspeakers in closer proximity to the repelling force position; capabilities of each loudspeaker relative to other loudspeakers in the environment; synchronization of the loudspeakers with respect to other loudspeakers; wakeword performance; and/or echo canceller performance.

Some such methods involve providing, via the interface system, the rendered audio signals to at least some loudspeakers of the set of loudspeakers of the environment. Some such methods involve reproduction of the rendered audio signals by at least some loudspeakers of the set of loudspeakers.

According to some implementations, the model of perceived spatial position may produce a binaural response corresponding to an audio object position at the left and right ears of a listener. In some examples, the model of perceived spatial position may place the perceived spatial position of an audio signal playing from a set of loudspeakers at a center of mass of the set of loudspeakers' positions weighted by the loudspeaker's associated activating gains. In some such examples, the model of perceived spatial position also may produce a binaural response corresponding to an audio object position at the left and right cars of a listener.

In some instances, the one or more additional dynamically configurable functions may be based, at least in part, on a level of the one or more audio signals. In some examples, the one or more additional dynamically configurable functions may be based, at least in part, on a spectrum of the one or more audio signals.

According to some implementations, the one or more additional dynamically configurable functions may be based, at least in part, on a location of each of the loudspeakers in the environment. In some instances, the capabilities of each loudspeaker may include one or more of frequency response, playback level limits or parameters of one or more loudspeaker dynamics processing algorithms. In some examples, the one or more additional dynamically configurable functions may be based, at least in part, on a measurement or estimate of acoustic transmission from each loudspeaker to the other loudspeakers.

According to some examples, the one or more additional dynamically configurable functions may be based, at least in part, on a location or locations of one or more people in the environment. In some such examples, the one or more additional dynamically configurable functions may be based, at least in part, on a measurement or estimate of acoustic transmission from each loudspeaker to the location or locations of the one or more people.

In some examples, the one or more additional dynamically configurable functions may be based, at least in part, on an object location of one or more non-loudspeaker objects in the environment. In some such examples, the one or more additional dynamically configurable functions may be based, at least in part, on a measurement or estimate of acoustic transmission from each loudspeaker to the object location.

In some instances, the one or more additional dynamically configurable functions may be based, at least in part, on an estimate of acoustic transmission from each speaker to one or more landmarks, areas or zones of the environment. According to some examples, the intended perceived spatial position may correspond to at least one of a channel of a channel-based audio format or positional metadata.

At least some aspects of the present disclosure may be implemented via apparatus. For example, one or more devices may be capable of performing, at least in part, the methods disclosed herein. In some implementations, an apparatus may include an interface system and a control system. The control system may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof.

In some implementations, the control system may be configured for performing one or more disclosed methods. Some such methods may involve receiving, by the control system and via the interface system, audio data. In some examples, the audio data includes one or more audio signals and associated spatial data. According to some examples, the spatial data indicates an intended perceived spatial position corresponding to an audio signal.

Some such methods involve rendering, by the control system, the audio data for reproduction via a set of loudspeakers of an environment, to produce rendered audio signals. In some examples, rendering each of the one or more audio signals included in the audio data involves determining relative activation of a set of loudspeakers in an environment by optimizing a cost that is a function of the following: a model of perceived spatial position of the audio signal played when played back over the set of loudspeakers in the environment; a measure of proximity of the intended perceived spatial position of the audio signal to a position of each loudspeaker of the set of loudspeakers; and one or more additional dynamically configurable functions.

According to some examples, the one or more additional dynamically configurable functions are based on one or more of the following: proximity of loudspeakers to one or more listeners; proximity of loudspeakers to an attracting force position, wherein an attracting force is a factor that favors relatively higher activation of loudspeakers in closer proximity to the attracting force position; proximity of loudspeakers to a repelling force position, wherein a repelling force is a factor that favors relatively lower activation of loudspeakers in closer proximity to the repelling force position; capabilities of each loudspeaker relative to other loudspeakers in the environment; synchronization of the loudspeakers with respect to other loudspeakers; wakeword performance; and/or echo canceller performance.

Some such methods involve providing, via the interface system, the rendered audio signals to at least some loudspeakers of the set of loudspeakers of the environment. Some such methods involve reproduction of the rendered audio signals by at least some loudspeakers of the set of loudspeakers.

According to some implementations, the model of perceived spatial position may produce a binaural response corresponding to an audio object position at the left and right cars of a listener. In some examples, the model of perceived spatial position may place the perceived spatial position of an audio signal playing from a set of loudspeakers at a center of mass of the set of loudspeakers' positions weighted by the loudspeaker's associated activating gains. In some such examples, the model of perceived spatial position also may produce a binaural response corresponding to an audio object position at the left and right cars of a listener.

In some instances, the one or more additional dynamically configurable functions may be based, at least in part, on a level of the one or more audio signals. In some examples, the one or more additional dynamically configurable functions may be based, at least in part, on a spectrum of the one or more audio signals.

According to some implementations, the one or more additional dynamically configurable functions may be based, at least in part, on a location of each of the loudspeakers in the environment. In some instances, the capabilities of each loudspeaker may include one or more of frequency response, playback level limits or parameters of one or more loudspeaker dynamics processing algorithms. In some examples, the one or more additional dynamically configurable functions may be based, at least in part, on a measurement or estimate of acoustic transmission from each loudspeaker to the other loudspeakers.

According to some examples, the one or more additional dynamically configurable functions may be based, at least in part, on a location or locations of one or more people in the environment. In some such examples, the one or more additional dynamically configurable functions may be based, at least in part, on a measurement or estimate of acoustic transmission from each loudspeaker to the location or locations of the one or more people.

In some examples, the one or more additional dynamically configurable functions may be based, at least in part, on an object location of one or more non-loudspeaker objects in the environment. In some such examples, the one or more additional dynamically configurable functions may be based, at least in part, on a measurement or estimate of acoustic transmission from each loudspeaker to the object location.

In some instances, the one or more additional dynamically configurable functions may be based, at least in part, on an estimate of acoustic transmission from each speaker to one or more landmarks, areas or zones of the environment. According to some examples, the intended perceived spatial position may correspond to at least one of a channel of a channel-based audio format or positional metadata.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

DETAILED DESCRIPTION OF EMBODIMENTS

Figure 1:
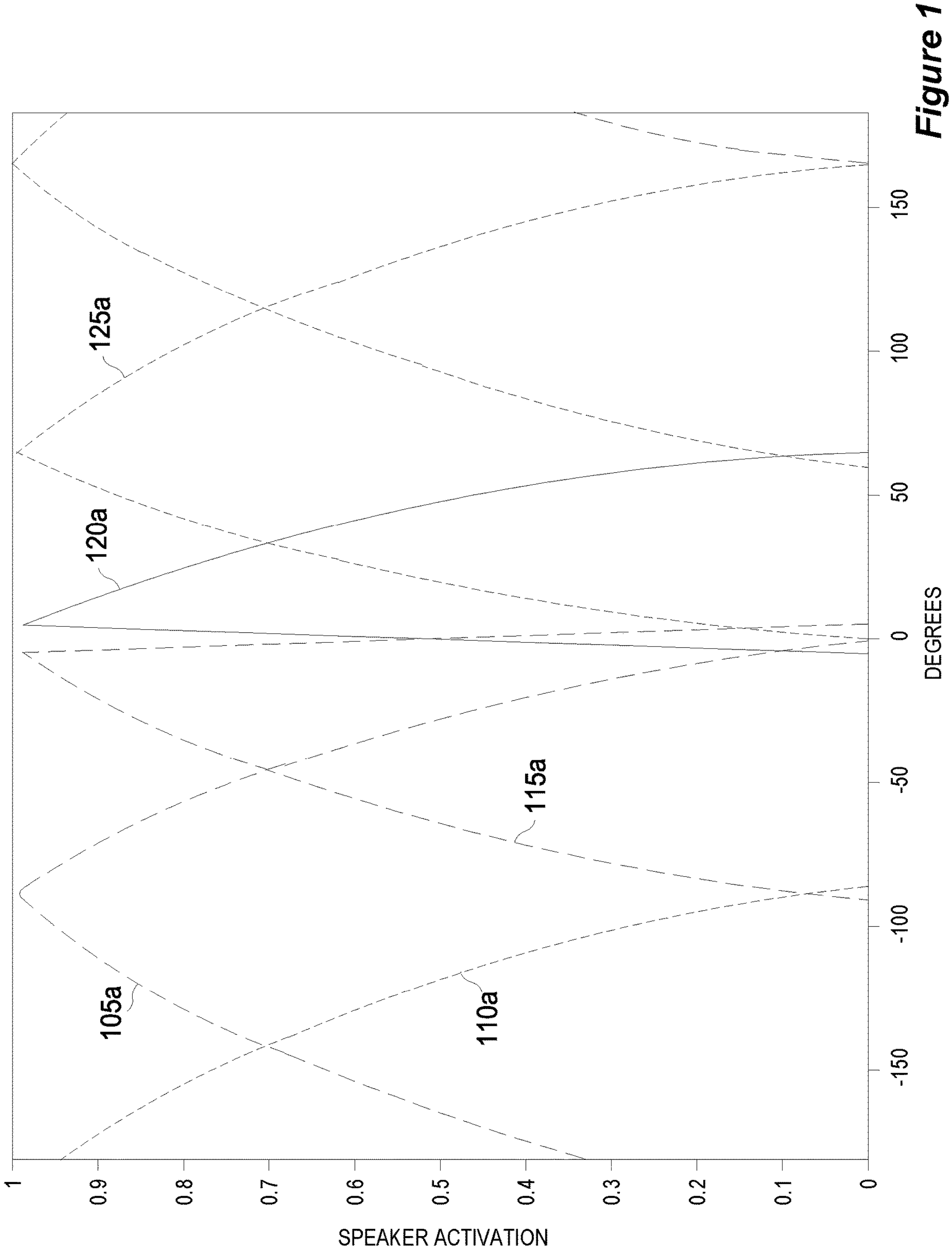
FIGS. 1 and 2 are diagrams which illustrate an example set of speaker activations and object rendering positions.

Flexible rendering allows spatial audio to be rendered over an arbitrary number of arbitrarily placed speakers. In view of the widespread deployment of audio devices, including but not limited to smart audio devices (e.g., smart speakers) in the home, there is a need for realizing flexible rendering technology that allows consumer products to perform flexible rendering of audio, and playback of the so-rendered audio.

Several technologies have been developed to implement flexible rendering. They cast the rendering problem as one of cost function minimization, where the cost function consists of two terms: a first term that models the desired spatial impression that the renderer is trying to achieve, and a second term that assigns a cost to activating speakers. To date this second term has focused on creating a sparse solution where only speakers in close proximity to the desired spatial position of the audio being rendered are activated.

Playback of spatial audio in a consumer environment has typically been tied to a prescribed number of loudspeakers placed in prescribed positions: for example, 5.1 and 7.1 surround sound. In these cases, content is authored specifically for the associated loudspeakers and encoded as discrete channels, one for each loudspeaker (e.g., Dolby Digital, or Dolby Digital Plus, etc.) More recently, immersive, object-based spatial audio formats have been introduced (Dolby Atmos) which break this association between the content and specific loudspeaker locations. Instead, the content may be described as a collection of individual audio objects, each with possibly time varying metadata describing the desired perceived location of said audio objects in three-dimensional space. At playback time, the content is transformed into loudspeaker feeds by a renderer which adapts to the number and location of loudspeakers in the playback system. Many such renderers, however, still constrain the locations of the set of loudspeakers to be one of a set of prescribed layouts (for example 3.1.2, 5.1.2, 7.1.4, 9.1.6, etc. with Dolby Atmos).

Moving beyond such constrained rendering, methods have been developed which allow object-based audio to be rendered flexibly over a truly arbitrary number of loudspeakers placed at arbitrary positions. These methods require that the renderer have knowledge of the number and physical locations of the loudspeakers in the listening space. For such a system to be practical for the average consumer, an automated method for locating the loudspeakers would be desirable. One such method relies on the use of a multitude of microphones, possibly co-located with the loudspeakers. By playing audio signals through the loudspeakers and recording with the microphones, the distance between each loudspeaker and microphone is estimated. From these distances the locations of both the loudspeakers and microphones are subsequently deduced.

Simultaneous to the introduction of object-based spatial audio in the consumer space has been the rapid adoption of so-called "smart speakers", such as the Amazon Echo line of products. The tremendous popularity of these devices can be attributed to their simplicity and convenience afforded by wireless connectivity and an integrated voice interface (Amazon's Alexa, for example), but the sonic capabilities of these devices has generally been limited, particularly with respect to spatial audio. In most cases these devices are constrained to mono or stereo playback. However, combining the aforementioned flexible rendering and auto-location technologies with a plurality of orchestrated smart speakers may yield a system with very sophisticated spatial playback capabilities and that still remains extremely simple for the consumer to set up. A consumer can place as many or few of the speakers as desired, wherever is convenient, without the need to run speaker wires due to the wireless connectivity, and the built-in microphones can be used to automatically locate the speakers for the associated flexible renderer.

Conventional flexible rendering algorithms are designed to achieve a particular desired perceived spatial impression as closely as possible. In a system of orchestrated smart speakers, at times, maintenance of this spatial impression may not be the most important or desired objective. For example, if someone is simultaneously attempting to speak to an integrated voice assistant, it may be desirable to momentarily alter the spatial rendering in a manner that reduces the relative playback levels on speakers near certain microphones in order to increase the signal to noise ratio of the recording. Some embodiments described herein may be implemented as modifications to existing flexible rendering methods, to allow such dynamic modification to spatial rendering, e.g., for the purpose of achieving one or more additional objectives.

Existing flexible rendering techniques include Center of Mass Amplitude Panning (CMAP) and Flexible Virtualization (FV). From a high level, both these techniques render a set of one or more audio signals, each with an associated desired perceived spatial position, for playback over a set of two or more speakers, where the relative activation of speakers of the set is a function of a model of perceived spatial position of said audio signals played back over the speakers and a proximity of the desired perceived spatial position of the audio signals to the positions of the speakers. The model ensures that the audio signal is heard by the listener near its intended spatial position, and the proximity term controls which speakers are used to achieve this spatial impression. In particular, the proximity term favors the activation of speakers that are near the desired perceived spatial position of the audio signal. For both CMAP and FV, this functional relationship is conveniently derived from a cost function written as the sum of two terms, one for the spatial aspect and one for proximity:

$$C(g) = C_{spatial}(g, \vec{o}, \{\vec{s}_i\}) + C_{proximity}(g, \vec{o}, \{\vec{s}_i\}) \tag{1}$$

Here, the set $\{\vec{s}i\}$ denotes the positions of a set of M loudspeakers, $\vec{o}$ denotes the desired perceived spatial position of the audio signal, and g denotes an M dimensional vector of speaker activations. For CMAP, each activation in the vector represents a gain per speaker, while for FV each activation represents a filter (in this second case g can equivalently be considered a vector of complex values at a particular frequency and a different g is computed across a plurality of frequencies to form the filter). The optimal vector of activations is found by minimizing the cost function across activations:

$$g_{opt} = \min_g C(g, \vec{o}, \{\vec{s}_i\}) \tag{2a}$$

With certain definitions of the cost function, it is difficult to control the absolute level of the optimal activations resulting from the above minimization, though the relative level between the components of $g_{opt}$ is appropriate. To deal with this problem, a subsequent normalization of $g_{opt}$ may be performed so that the absolute level of the activations is controlled. For example, normalization of the vector to have unit length may be desirable, which is in line with a commonly used constant power panning rules:

$$\bar{g}_{opt} = \frac{g_{opt}}{\|g_{opt}\|} \tag{2b}$$

The exact behavior of the flexible rendering algorithm is dictated by the particular construction of the two terms of the cost function, $C_{spatial}$ and $C_{proximity}$. For CMAP, $C_{spatial}$ is derived from a model that places the perceived spatial position of an audio signal playing from a set of loudspeakers at the center of mass of those loudspeakers' positions weighted by their associated activating gains $g_i$ (elements of the vector g):

$$\vec{o} = \frac{\sum_{i=1}^{M} g_i \vec{s}_i}{\sum_{i=1}^{M} g_i} \tag{3}$$

Equation 3 is then manipulated into a spatial cost representing the squared error between the desired audio position and that produced by the activated loudspeakers:

$$C_{spatial}(g, \vec{o}, \{\vec{s}_i\}) = \left\|\left(\sum_{i=1}^{M} g_i\right)\vec{o} - \sum_{i=1}^{M} g_i \vec{s}_i\right\|^2 = \left\|\sum_{i=1}^{M} g_i(\vec{o} - \vec{s}_i)\right\|^2 \tag{4}$$

With FV, the spatial term of the cost function is defined differently. There the goal is to produce a binaural response b corresponding to the audio object position $\vec{o}$ at the left and right ears of the listener. Conceptually, b is a 2×1 vector of filters (one filter for each ear) but is more conveniently treated as a 2×1 vector of complex values at a particular frequency. Proceeding with this representation at a particular frequency, the desired binaural response may be retrieved from a set of HRTFs indexed by object position:

$$b = HRTF\{\vec{o}\} \tag{5}$$

At the same time, the 2×1 binaural response e produced at the listener's ears by the loudspeakers is modelled as a 2×M acoustic transmission matrix H multiplied with the M×1 vector g of complex speaker activation values:

$$e = Hg \tag{6}$$

The acoustic transmission matrix H is modelled based on the set of loudspeaker positions $\{\vec{s}_i\}$ with respect to the listener position. Finally, the spatial component of the cost function is defined as the squared error between the desired binaural response (Equation 5) and that produced by the loudspeakers (Equation 6):

$$C_{spatial}(g, \vec{o}, \{\vec{s}_i\}) = (b - Hg)^*(b - Hg) \tag{7}$$

Conveniently, the spatial term of the cost function for CMAP and FV defined in Equations 4 and 7 can both be rearranged into a matrix quadratic as a function of speaker activations g:

$$C_{spatial}(g, \vec{o}, \{\vec{s}_i\}) = g^* Ag + Bg + C \tag{8}$$

where A is an M×M square matrix, B is a 1×M vector, and C is a scalar. The matrix A is of rank 2, and therefore when M>2 there exist an infinite number of speaker activations g for which the spatial error term equals zero. Introducing the second term of the cost function, $C_{proximity}$, removes this indeterminacy and results in a particular solution with perceptually beneficial properties in comparison to the other possible solutions. For both CMAP and FV, $C_{proximity}$ is constructed such that activation of speakers whose position $\vec{s}_i$ is distant from the desired audio signal position $\vec{o}$ is penalized more than activation of speakers whose position is close to the desired position. This construction yields an optimal set of speaker activations that is sparse, where only speakers in close proximity to the desired audio signal's position are significantly activated, and practically results in a spatial reproduction of the audio signal that is perceptually more robust to listener movement around the set of speakers.

To this end, the second term of the cost function, $C_{proximity}$, may be defined as a distance-weighted sum of the absolute values squared of speaker activations. This is represented compactly in matrix form as:

$$C_{proximity}(g, \vec{o}, \{\vec{s}_i\}) = g^* Dg \tag{9a}$$

where D is a diagonal matrix of distance penalties between the desired audio position and each speaker:

$$D = \begin{bmatrix} d_1 & \cdots & 0 \\ \vdots & \ddots & \vdots \\ 0 & \cdots & d_M \end{bmatrix}, \; d_i = \text{distance}(\vec{o}, \vec{s}_i) \tag{9b}$$

The distance penalty function can take on many forms, but the following is a useful parameterization $$\text{distance}(\vec{o}, \vec{s}_i) = \alpha d_0^2 \left(\frac{\|\vec{o} - \vec{s}_i\|}{d_0}\right)^{\beta} \tag{9c}$$

where $\|\vec{o} - \vec{s}_i\|$ is the Euclidean distance between the desired audio position and speaker position and $\alpha$ and $\beta$ are tunable parameters. The parameter $\alpha$ indicates the global strength of the penalty; $d_0$ corresponds to the spatial extent of the distance penalty (loudspeakers at a distance around $d_0$ or further away will be penalized), and $\beta$ accounts for the abruptness of the onset of the penalty at distance $d_0$.

Combining the two terms of the cost function defined in Equations 8 and 9a yields the overall cost function $$C(g) = g^* Ag + Bg + C + g^* Dg = g^*(A + D)g + Bg + C \tag{10}$$

Setting the derivative of this cost function with respect to g equal to zero and solving for g yields the optimal speaker activation solution:

$$g_{opt} = \frac{1}{2}(A + D)^{-1}B \tag{11}$$

In general, the optimal solution in Equation 11 may yield speaker activations that are negative in value. For the CMAP construction of the flexible renderer, such negative activations may not be desirable, and thus Equation (11) may be minimized subject to all activations remaining positive.

Figure 2:
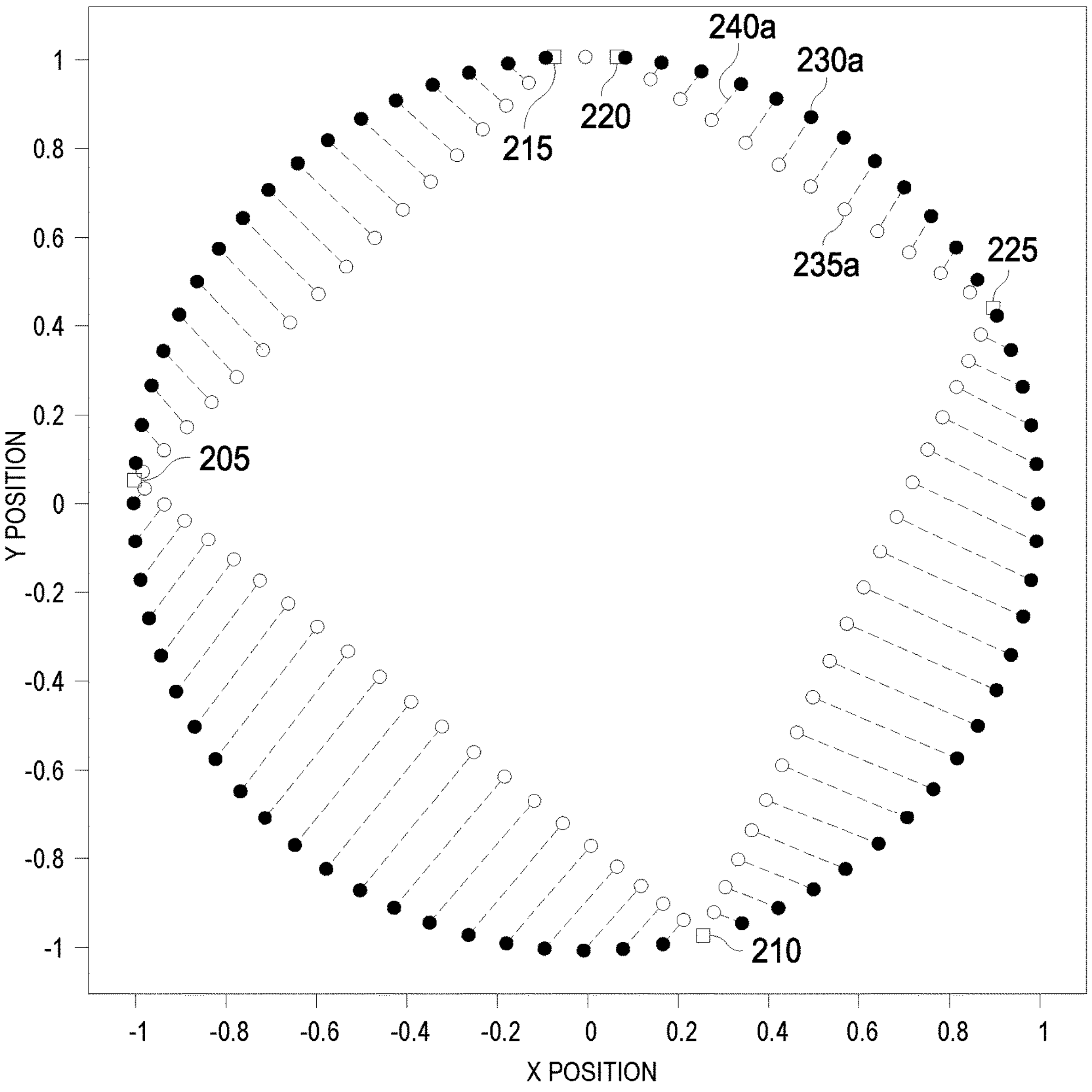

FIGS. 1 and 2 are diagrams which illustrate an example set of speaker activations and object rendering positions. In these examples, the speaker activations and object rendering positions correspond to speaker positions of 4, 64, 165, −87, and −4 degrees. FIG. 1 shows the speaker activations 105*a*, 110*a*, 115*a*, 120*a* and 125*a*, which comprise the optimal solution to Equation 11 for these particular speaker positions. FIG. 2 plots the individual speaker positions as dots 205, 210, 215, 220 and 225, which correspond to speaker activations 105*a*, 110*a*, 115*a*, 120*a* and 125*a*, respectively. FIG. 2 also shows ideal object positions (in other words, positions at which audio objects are to be rendered) for a multitude of possible object angles as dots 230*a* and the corresponding actual rendering positions for those objects as dots 235*a*, connected to the ideal object positions by dotted lines 240*a*.

A class of embodiments involves methods for rendering audio for playback by at least one (e.g., all or some) of a plurality of coordinated (orchestrated) smart audio devices. For example, a set of smart audio devices present (in a system) in a user's home may be orchestrated to handle a variety of simultaneous use cases, including flexible rendering (in accordance with an embodiment) of audio for playback by all or some (i.e., by speaker(s) of all or some) of the smart audio devices. Many interactions with the system are contemplated which require dynamic modifications to the rendering. Such modifications may be, but are not necessarily, focused on spatial fidelity.

Some embodiments are methods for rendering of audio for playback by at least one (e.g., all or some) of the smart audio devices of a set of smart audio devices (or for playback by at least one (e.g., all or some) of the speakers of another set of speakers). The rendering may include minimization of a cost function, where the cost function includes at least one dynamic speaker activation term. Examples of such a dynamic speaker activation term include (but are not limited to):

- Proximity of speakers to one or more listeners;
- Proximity of speakers to an attracting or repelling force;
- Audibility of the speakers with respect to some location (e.g., listener position, or baby room);
- Capability of the speakers (e.g., frequency response and distortion);
- Synchronization of the speakers with respect to other speakers;
- Wakeword performance; and
- Echo canceller performance.

The dynamic speaker activation term(s) may enable at least one of a variety of behaviors, including warping the spatial presentation of the audio away from a particular smart audio device so that its microphone can better hear a talker or so that a secondary audio stream may be better heard from speaker(s) of the smart audio device.

Some embodiments implement rendering for playback by speaker(s) of a plurality of smart audio devices that are coordinated (orchestrated). Other embodiments implement rendering for playback by speaker(s) of another set of speakers.

Pairing flexible rendering methods (implemented in accordance with some embodiments) with a set of wireless smart speakers (or other smart audio devices) can yield an extremely capable and easy-to-use spatial audio rendering system. In contemplating interactions with such a system it becomes evident that dynamic modifications to the spatial rendering may be desirable in order to optimize for other objectives that may arise during the system's use. To achieve this goal, a class of embodiments augment existing flexible rendering algorithms (in which speaker activation is a function of the previously disclosed spatial and proximity terms), with one or more additional dynamically configurable functions dependent on one or more properties of the audio signals being rendered, the set of speakers, and/or other external inputs. In accordance with some embodiments, the cost function of the existing flexible rendering given in Equation 1 is augmented with these one or more additional dependencies according to $$C(g) = C_{spatial}\left(g, \vec{o}, \{\vec{s}_i\}\right) + C_{proximity}\left(g, \vec{o}, \{\vec{s}_i\}\right) + \sum_j C_j\left(g, \{\{\hat{o}\}, \{\hat{s}_i\}, \{\hat{e}\}\}_j\right) \tag{12}$$

In Equation 12, the terms $C_j$ (g, $\{\{\hat{o}\}, \{\hat{s}_i\}, \{\hat{e}\}\}_j$) represent additional cost terms, with $\{\hat{o}\}$ representing a set of one or more properties of the audio signals (e.g., of an object-based audio program) being rendered, $\{\hat{s}_i\}$ representing a set of one or more properties of the speakers over which the audio is being rendered, and $\{\hat{e}\}$ representing one or more additional external inputs. Each term $C_j$ (g, $\{\{\hat{o}\}, \{\hat{s}_i\}, \{\hat{e}\}\}_j$) returns a cost as a function of activations g in relation to a combination of one or more properties of the audio signals, speakers, and/or external inputs, represented generically by the set $\{\{\hat{o}\}, \{\hat{s}_i\}, \{\hat{e}\}\}_j$. It should be appreciated that the set $\{\{\hat{o}\}, \{\hat{s}_i\}, \{\hat{e}\}\}_j$, contains at a minimum only one element from any of $\{\hat{o}\}$, $\{\hat{s}_i\}$, or $\{\hat{e}\}$.

Examples of $\{\hat{o}\}$ include but are not limited to:

- Desired perceived spatial position of the audio signal;
- Level (possible time-varying) of the audio signal; and/or
- Spectrum (possibly time-varying) of the audio signal.

Examples of $\{\hat{s}_i\}$ include but are not limited to:

- Locations of the loudspeakers in the listening space;
- Frequency response of the loudspeakers;
- Playback level limits of the loudspeakers;
- Parameters of dynamics processing algorithms within the speakers, such as limiter gains;
- A measurement or estimate of acoustic transmission from each speaker to the others;
- A measure of echo canceller performance on the speakers; and/or
- Relative synchronization of the speakers with respect to each other.

Examples of $\{\hat{e}\}$ include but are not limited to:

- Locations of one or more listeners or talkers in the playback space;
- A measurement or estimate of acoustic transmission from each loudspeaker to the listening location;
- A measurement or estimate of the acoustic transmission from a talker to the set of loudspeakers;

Location of some other landmark in the playback space; and/or

A measurement or estimate of acoustic transmission from each speaker to some other landmark in the playback space;

With the new cost function defined in Equation 12, an optimal set of activations may be found through minimization with respect to g and possible post-normalization as previously specified in Equations 2a and 2b.

Figure 3A:
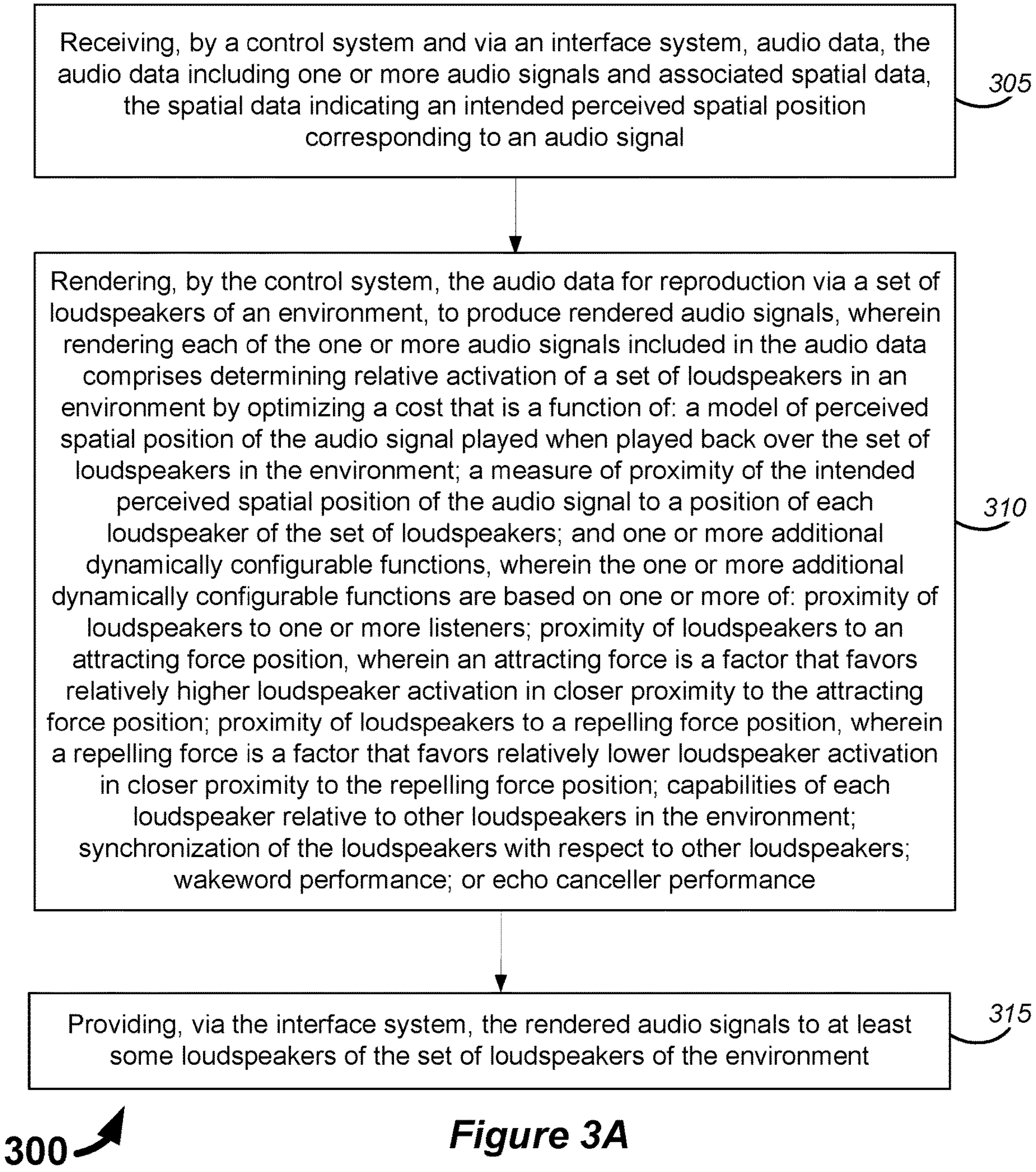
FIG. 3A is a flow diagram that outlines one example of a method that may be performed by an apparatus or system such as those shown in FIG. 11 or FIG. 12.
Figure 11:
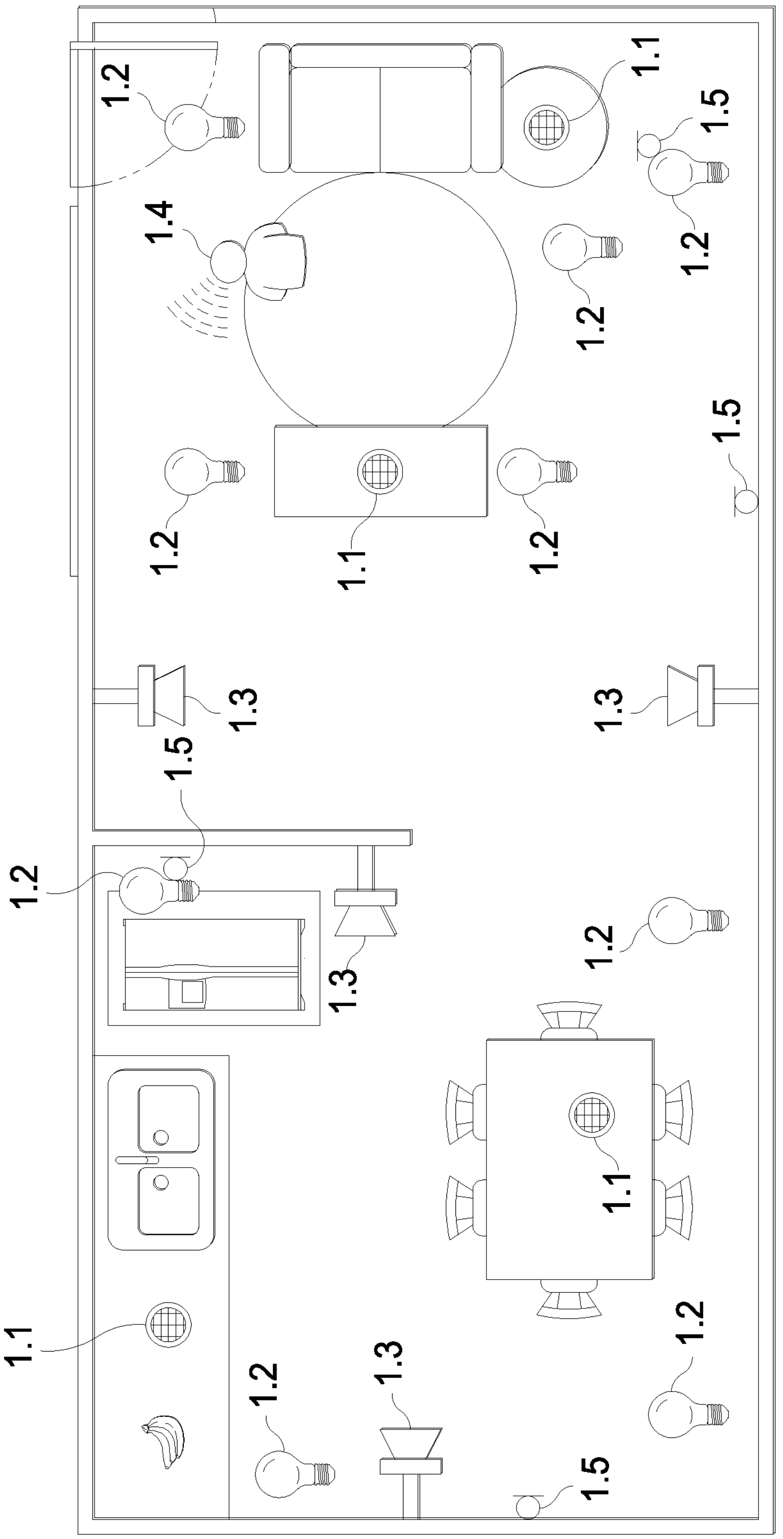
FIG. 11 is a diagram of an environment according to one example.
Figure 12:
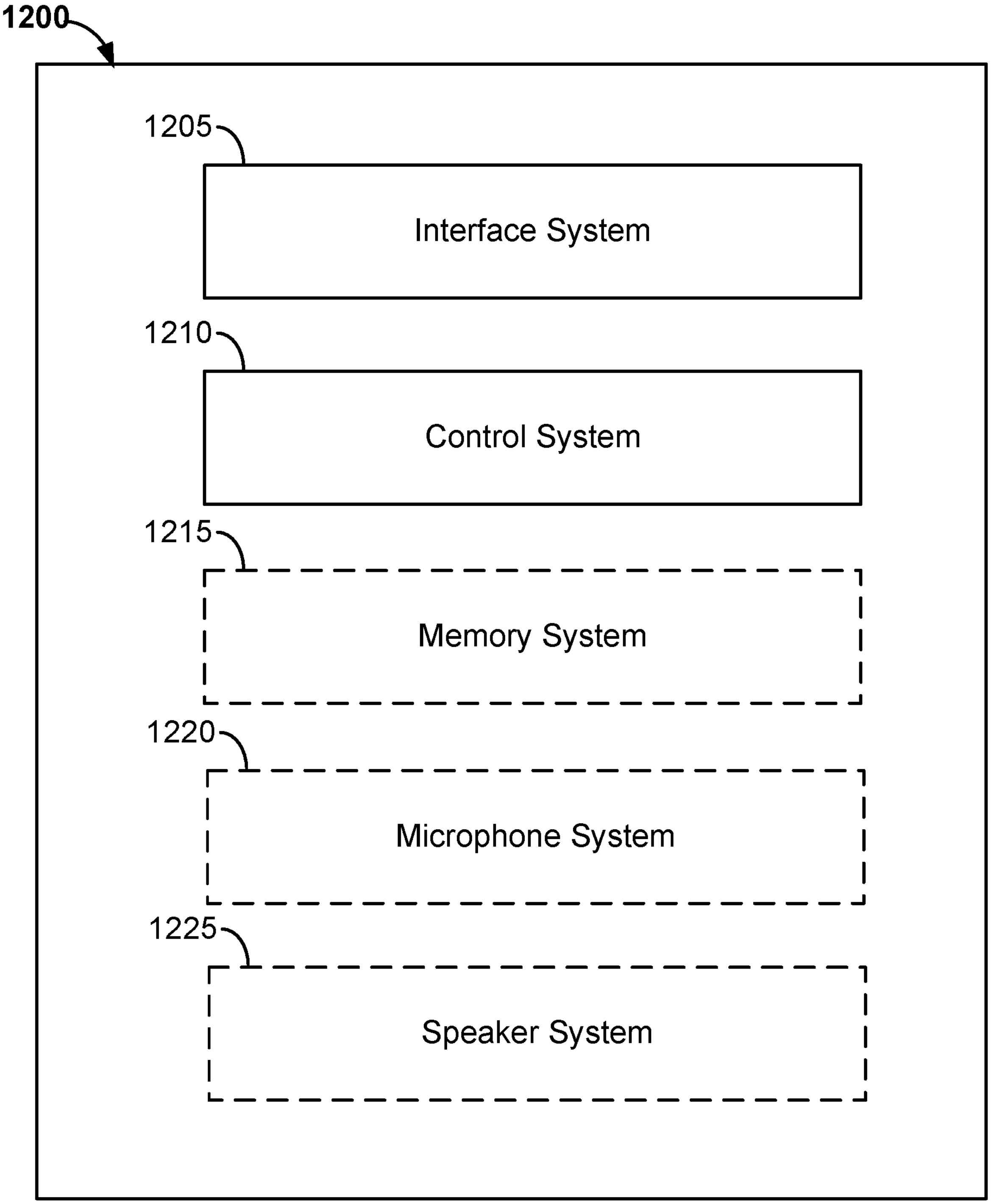
FIG. 12 is a block diagram that shows examples of components of an apparatus capable of implementing various aspects of this disclosure.

FIG. 3A is a flow diagram that outlines one example of a method that may be performed by an apparatus or system such as those shown in FIG. 11 or FIG. 12. The blocks of method 300, like other methods described herein, are not necessarily performed in the order indicated. Moreover, such methods may include more or fewer blocks than shown and/or described. The blocks of method 300 may be performed by one or more devices, which may be (or may include) a control system such as the control system 1210 shown in FIG. 12.

In this implementation, block 305 involves receiving, by a control system and via an interface system, audio data. In this example, the audio data includes one or more audio signals and associated spatial data. According to this implementation, the spatial data indicates an intended perceived spatial position corresponding to an audio signal. In some instances, the intended perceived spatial position may be explicit, e.g., as indicated by positional metadata such as Dolby Atmos positional metadata. In other instances, the intended perceived spatial position may be implicit, e.g., the intended perceived spatial position may be an assumed location associated with a channel according to Dolby 5.1, Dolby 7.1, or another channel-based audio format. In some examples, block 305 involves a rendering module of a control system receiving, via an interface system, the audio data.

According to this example, block 310 involves rendering, by the control system, the audio data for reproduction via a set of loudspeakers of an environment, to produce rendered audio signals. In this example, rendering each of the one or more audio signals included in the audio data involves determining relative activation of a set of loudspeakers in an environment by optimizing a cost function. According to this example, the cost is a function of a model of perceived spatial position of the audio signal when played back over the set of loudspeakers in the environment. In this example, the cost is also a function of a measure of proximity of the intended perceived spatial position of the audio signal to a position of each loudspeaker of the set of loudspeakers. In this implementation, the cost is also a function of one or more additional dynamically configurable functions. In this example, the dynamically configurable functions are based on one or more of the following: proximity of loudspeakers to one or more listeners; proximity of loudspeakers to an attracting force position, wherein an attracting force is a factor that favors relatively higher loudspeaker activation in closer proximity to the attracting force position; proximity of loudspeakers to a repelling force position, wherein a repelling force is a factor that favors relatively lower loudspeaker activation in closer proximity to the repelling force position; capabilities of each loudspeaker relative to other loudspeakers in the environment; synchronization of the loudspeakers with respect to other loudspeakers; wakeword performance; or echo canceller performance.

In this example, block 315 involves providing, via the interface system, the rendered audio signals to at least some loudspeakers of the set of loudspeakers of the environment.

According to some examples, the model of perceived spatial position may produce a binaural response corresponding to an audio object position at the left and right cars of a listener. Alternatively, or additionally, the model of perceived spatial position may place the perceived spatial position of an audio signal playing from a set of loudspeakers at a center of mass of the set of loudspeakers' positions weighted by the loudspeaker's associated activating gains.

In some examples, the one or more additional dynamically configurable functions may be based, at least in part, on a level of the one or more audio signals. In some instances, the one or more additional dynamically configurable functions may be based, at least in part, on a spectrum of the one or more audio signals.

Some examples of the method 300 involve receiving loudspeaker layout information. In some examples, the one or more additional dynamically configurable functions may be based, at least in part, on a location of each of the loudspeakers in the environment.

Some examples of the method 300 involve receiving loudspeaker specification information. In some examples, the one or more additional dynamically configurable functions may be based, at least in part, on the capabilities of each loudspeaker, which may include one or more of frequency response, playback level limits or parameters of one or more loudspeaker dynamics processing algorithms.

According to some examples, the one or more additional dynamically configurable functions may be based, at least in part, on a measurement or estimate of acoustic transmission from each loudspeaker to the other loudspeakers. Alternatively, or additionally, the one or more additional dynamically configurable functions may be based, at least in part, on a listener or speaker location of one or more people in the environment. Alternatively, or additionally, the one or more additional dynamically configurable functions may be based, at least in part, on a measurement or estimate of acoustic transmission from each loudspeaker to the listener or speaker location. An estimate of acoustic transmission may, for example be based at least in part on walls, furniture or other objects that may reside between each loudspeaker and the listener or speaker location.

Alternatively, or additionally, the one or more additional dynamically configurable functions may be based, at least in part, on an object location of one or more non-loudspeaker objects or landmarks in the environment. In some such implementations, the one or more additional dynamically configurable functions may be based, at least in part, on a measurement or estimate of acoustic transmission from each loudspeaker to the object location or landmark location.

Numerous new and useful behaviors may be achieved by employing one or more appropriately defined additional cost terms to implement flexible rendering. All example behaviors listed below are cast in terms of penalizing certain loudspeakers under certain conditions deemed undesirable. The end result is that these loudspeakers are activated less in the spatial rendering of the set of audio signals. In many of these cases, one might contemplate simply turning down the undesirable loudspeakers independently of any modification to the spatial rendering, but such a strategy may significantly degrade the overall balance of the audio content. Certain components of the mix may become completely inaudible, for example. With the disclosed embodiments, on the other hand, integration of these penalizations into the core optimization of the rendering allows the rendering to adapt and perform the best possible spatial rendering with the remaining less-penalized speakers. This is a much more elegant, adaptable, and effective solution.

Example use cases include, but are not limited to:

- Providing a more balanced spatial presentation around the listening area
  - It has been found that spatial audio is best presented across loudspeakers that are roughly the same distance from the intended listening area. A cost may be constructed such that loudspeakers that are significantly closer or further away than the mean distance of loudspeakers to the listening area are penalized, thus reducing their activation;
- Moving audio away from or towards a listener or talker
  - If a user of the system is attempting to speak to a smart voice assistant of or associated with the system, it may be beneficial to create a cost which penalizes loudspeakers closer to the talker. This way, these loudspeakers are activated less, allowing their associated microphones to better hear the talker;
  - To provide a more intimate experience for a single listener that minimizes playback levels for others in the listening space, speakers far from the listener's location may be penalized heavily so that only speakers closest to the listener are activated most significantly;
- Moving audio away from or towards a landmark, zone or area
  - Certain locations in the vicinity of the listening space may be considered sensitive, such as a baby's room, a baby's bed, an office, a reading area, a study area, etc. In such a case, a cost may be constructed the penalizes the use of speakers close to this location, zone or area;
  - Alternatively, for the same case above (or similar cases), the system of speakers may have generated measurements of acoustic transmission from each speaker into the baby's room, particularly if one of the speakers (with an attached or associated microphone) resides within the baby's room itself. In this case, rather than using physical proximity of the speakers to the baby's room, a cost may be constructed that penalizes the use of speakers whose measured acoustic transmission into the room is high; and/or
- Optimal use of the speakers' capabilities
  - The capabilities of different loudspeakers can vary significantly. For example, one popular smart speaker contains only a single 1.6" full range driver with limited low frequency capability. On the other hand, another smart speaker contains a much more capable 3" woofer. These capabilities are generally reflected in the frequency response of a speaker, and as such, the set of responses associated with the speakers may be utilized in a cost term. At a particular frequency, speakers that are less capable relative to the others, as measured by their frequency response, are penalized and therefore activated to a lesser degree. In some implementations, such frequency response values may be stored with a smart loudspeaker and then reported to the computational unit responsible for optimizing the flexible rendering;
  - Many speakers contain more than one driver, each responsible for playing a different frequency range. For example, one popular smart speaker is a two-way design containing a woofer for lower frequencies and a tweeter for higher frequencies. Typically, such a speaker contains a crossover circuit to divide the full-range playback audio signal into the appropriate frequency ranges and send to the respective drivers. Alternatively, such a speaker may provide the flexible renderer playback access to each individual driver as well as information about the capabilities of each individual driver, such as frequency response. By applying a cost term such as that described just above, in some examples the flexible renderer may automatically build a crossover between the two drivers based on their relative capabilities at different frequencies;
  - The above-described example uses of frequency response focus on the inherent capabilities of the speakers but may not accurately reflect the capability of the speakers as placed in the listening environment. In certain cases, the frequencies responses of the speakers as measured in the intended listening position may be available through some calibration procedure. Such measurements may be used instead of precomputed responses to better optimize use of the speakers. For example, a certain speaker may be inherently very capable at a particular frequency, but because of its placement (behind a wall or a piece of furniture for example) might produce a very limited response at the intended listening position. A measurement that captures this response and is fed into an appropriate cost term can prevent significant activation of such a speaker;
  - Frequency response is only one aspect of a loudspeaker's playback capabilities. Many smaller loudspeakers start to distort and then hit their excursion limit as playback level increases, particularly for lower frequencies. To reduce such distortion many loudspeakers implement dynamics processing which constrains the playback level below some limit thresholds that may be variable across frequency. In cases where a speaker is near or at these thresholds, while others participating in flexible rendering are not, it makes sense to reduce signal level in the limiting speaker and divert this energy to other less taxed speakers. Such behavior can be automatically achieved in accordance with some embodiments by properly configuring an associated cost term. Such a cost term may involve one or more of the following:
    - Monitoring a global playback volume in relation to the limit thresholds of the loudspeakers. For example, a loudspeaker for which the volume level is closer to its limit threshold may be penalized more;
    - Monitoring dynamic signals levels, possibly varying across frequency, in relationship to loudspeaker limit thresholds, also possibly varying across frequency. For example, a loudspeaker for which the monitored signal level is closer to its limit thresholds may be penalized more;
    - Monitoring parameters of the loudspeakers' dynamics processing directly, such as limiting gains. In some such examples, a loudspeaker for which the parameters indicate more limiting may be penalized more; and/or
    - Monitoring the actual instantaneous voltage, current, and power being delivered by an amplifier to a loudspeaker to determine if the loudspeaker is operating in a linear range. For example, a loudspeaker which is operating less linearly may be penalized more;
  - Smart speakers with integrated microphones and an interactive voice assistant typically employ some type of echo cancellation to reduce the level of audio signal playing out of the speaker as picked up by the recording microphone. The greater this reduction, the better chance the speaker has of hearing and understanding a talker in the space. If the residual of the echo canceller is consistently high, this may be an indication that the speaker is being driven into a non-linear region where prediction of the echo path becomes challenging. In such a case it may make sense to divert signal energy away from the speaker, and as such, a cost term taking into account echo canceller performance may be beneficial. Such a cost term may assign a high cost to a speaker for which its associated echo canceller is performing poorly;

In order to achieve predictable imaging when rendering spatial audio over multiple loudspeakers, it is generally required that playback over the set of loudspeakers be reasonably synchronized across time. For wired loudspeakers this is a given, but with a multitude of wireless loudspeakers synchronization may be challenging and the end-result variable. In such a case it may be possible for each loudspeaker to report its relative degree of synchronization with a target, and this degree may then feed into a synchronization cost term. In some such examples, loudspeakers with a lower degree of synchronization may be penalized more and therefore excluded from rendering. Additionally, tight synchronization may not be required for certain types of audio signals, for example components of the audio mix intended to be diffuse or non-directional. In some implementations, components may be tagged as such with metadata and a synchronization cost term may be modified such that the penalization is reduced.

We next describe examples of embodiments.

Similar to the proximity cost defined in Equations 9a and 9b, it is also convenient to express each of the new cost function terms $C_j(g, \{\{\hat{o}\}, \{\hat{s}_i\}, \{\hat{e}\}\}_j)$ as a weighted sum of the absolute values squared of speaker activations:

$$C_j(g, \{\{\hat{o}\}, \{\hat{s}_i\}, \{\hat{e}\}\}_j) = g^* W_j(\{\{\hat{o}\}, \{\hat{s}_i\}, \{\hat{e}\}\}_j) g, \tag{13a}$$

where $W_j$ is a diagonal matrix of weights $w_{ij}=w_{ij}(\{\{\hat{o}\}, \{\hat{s}_i\}, \{\hat{e}\}\}_j)$ describing the cost associated with activating speaker i for the term j:

$$W_j = \begin{bmatrix} w_{1j} & \ldots & 0 \\ \vdots & \ddots & \vdots \\ 0 & \ldots & w_{Mj} \end{bmatrix} \tag{13b}$$

Combining Equations 13a and b with the matrix quadratic version of the CMAP and FV cost functions given in Equation 10 yields a potentially beneficial implementation of the general expanded cost function (of some embodiments) given in Equation 12:

$$C(g) = g^* A g + B g + C + g^* D g + \sum_j g^* W_j g = g^*\left(A + D + \sum_j W_j\right) g + B g + C \tag{14}$$

With this definition of the new cost function terms, the overall cost function remains a matrix quadratic, and the optimal set of activations $g_{opt}$ can be found through differentiation of Equation 14 to yield $$g_{opt} = \frac{1}{2}\left(A + D + \sum_j W_j\right)^{-1} B \tag{15}$$

It is useful to consider each one of the weight terms $w_{ij}$ as functions of a given continuous penalty value $p_{ij}=p_{ij}(\{\{\hat{o}\}, \{\hat{s}_i\}, \{\hat{e}\}\}_j)$ for each one of the loudspeakers. In one example embodiment, this penalty value is the distance from the object (to be rendered) to the loudspeaker considered. In another example embodiment, this penalty value represents the inability of the given loudspeaker to reproduce some frequencies. Based on this penalty value, the weight terms $w_{ij}$ can be parametrized as:

$$w_{ij} = \alpha_j f_j\left(\frac{p_{ij}}{\tau_j}\right) \tag{16}$$

where $\alpha_j$ represents a pre-factor (which takes into account the global intensity of the weight term), where $\tau_j$ represents a penalty threshold (around or beyond which the weight term becomes significant), and where $f_j(x)$ represents a monotonically increasing function. For example, with $f_j(x)=x^{\beta_j}$ the weight term has the form:

$$w_{ij} = \alpha_j\left(\frac{p_{ij}}{\tau_j}\right)^{\beta_j} \tag{17}$$

where $\alpha_j$, $\beta_j$, $\tau_j$ are tunable parameters which respectively indicate the global strength of the penalty, the abruptness of the onset of the penalty and the extent of the penalty. Care should be taken in setting these tunable values so that the relative effect of the cost term $C_j$ with respect any other additional cost terms as well as $C_{spatial}$ and $C_{proximity}$ is appropriate for achieving the desired outcome. For example, as a rule of thumb, if one desires a particular penalty to clearly dominate the others then setting its intensity a roughly ten times larger than the next largest penalty intensity may be appropriate.

In case all loudspeakers are penalized, it is often convenient to subtract the minimum penalty from all weight terms in post-processing so that at least one of the speakers is not penalized:

$$w_{ij} \rightarrow w'_{ij} = w_{ij} - \min_i(w_{ij}) \tag{18}$$

As stated above, there are many possible use cases that can be realized using the new cost function terms described herein (and similar new cost function terms employed in accordance with other embodiments). Next, we describe more concrete details with three examples: moving audio towards a listener or talker, moving audio away from a listener or talker, and moving audio away from a landmark.

In the first example, what will be referred to herein as an "attracting force" is used to pull audio towards a position, which in some examples may be the position of a listener or a talker a landmark position, a furniture position, etc. The position may be referred to herein as an "attracting force position" or an "attractor location." As used herein an "attracting force" is a factor that favors relatively higher loudspeaker activation in closer proximity to an attracting force position. According to this example, the weight $w_{ij}$ takes the form of equation 17 with the continuous penalty value $p_{ij}$ given by the distance of the ith speaker from a fixed attractor location $\vec{l}_j$ and the threshold value $\tau_j$ given by the maximum of these distances across all speakers:

$$p_{ij} = \left\|\vec{l}_j - \vec{s}_i\right\|, \text{ and} \tag{19a}$$

$$\tau_j = \max_i \left\|\vec{l}_j - \vec{s}_i\right\| \tag{19b}$$

Figure 3B:
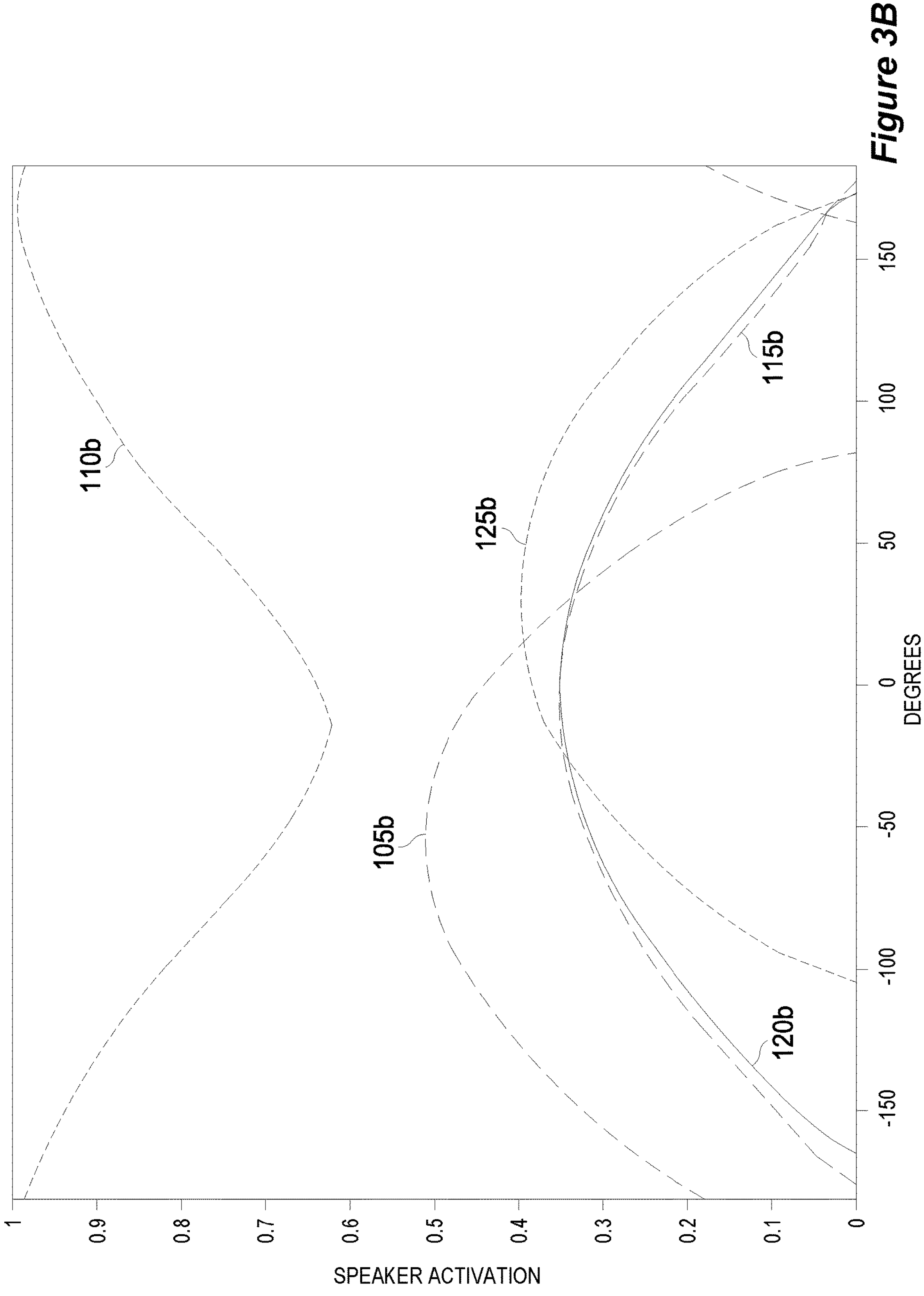
FIG. 3B is a graph of speaker activations in an example embodiment.
Figure 4:
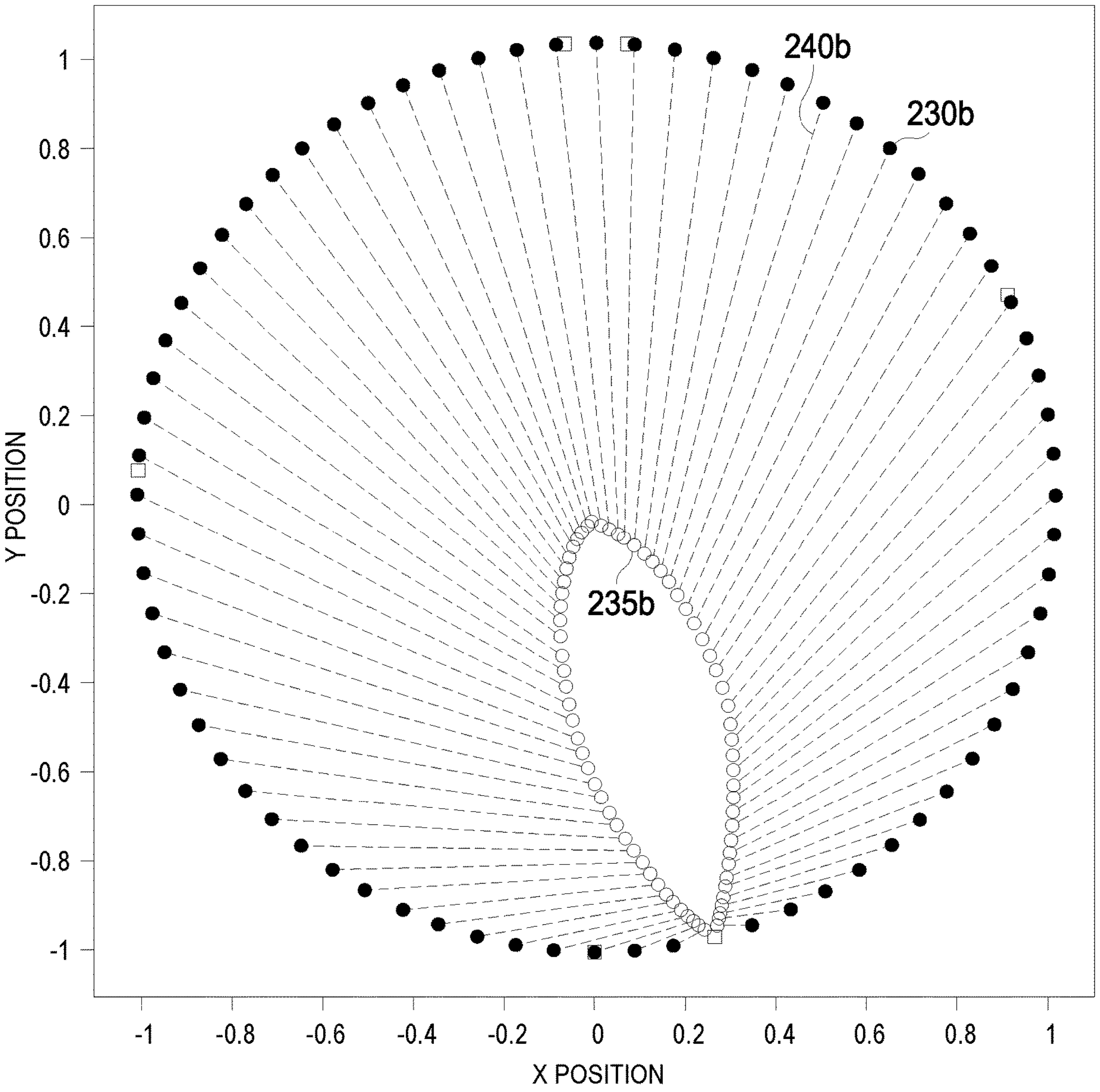
FIG. 4 is a graph of object rendering positions in an example embodiment.

To illustrate the use case of "pulling" audio towards a listener or talker, we specifically set $\alpha_j$=20, $\beta_j$=3, and $\vec{l}_j$ to a vector corresponding to a listener/talker position of 180 degrees (bottom, center of the plot). These values of $\alpha_j$, $\beta_j$, and $\vec{l}_j$ are merely examples. In some implementations, a, may be in the range of 1 to 100 and $\beta_j$ may be in the range of 1 to 25. FIG. 3B is a graph of speaker activations in an example embodiment. In this example, FIG. 3B shows the speaker activations 105*b*, 110*b*, 115*b*, 120*b* and 125*b*, which comprise the optimal solution to the cost function for the same speaker positions from FIGS. 1 and 2 with the addition of the attracting force represented by $w_{ij}$. FIG. 4 is a graph of object rendering positions in an example embodiment. In this example, FIG. 4 shows the corresponding ideal object positions 230*b* for a multitude of possible object angles and the corresponding actual rendering positions 235*b* for those objects, connected to the ideal object positions 230*b* by dotted lines 240*b*. The skewed orientation of the actual rendering positions 235*b* towards the fixed position $\vec{l}_j$ illustrates the impact of the attractor weightings on the optimal solution to the cost function.

In the second and third examples, a "repelling force" is used to "push" audio away from a position, which may be a person's position (e.g., a listener position, a talker position, etc.) or another position, such as a landmark position, a furniture position, etc. In some examples, a repelling force may be used to push audio away from an area or zone of a listening environment, such as an office area, a reading area, a bed or bedroom area (e.g., a baby's bed or bedroom), etc. According to some such examples, a particular position may be used as representative of a zone or area. For example, a position that represents a baby's bed may be an estimated position of the baby's head, an estimated sound source location corresponding to the baby, etc. The position may be referred to herein as a "repelling force position" or a "repelling location." As used herein an "repelling force" is a factor that favors relatively lower loudspeaker activation in closer proximity to the repelling force position. According to this example, we define $p_{ij}$ and $\tau_j$ with respect to a fixed repelling location $\vec{l}_j$ similarly to the attracting force in Equation 19:

$$p_{ij} = \max_i \left\|\vec{l}_j - \vec{s}_i\right\| - \left\|\vec{l}_j - \vec{s}_i\right\|, \text{ and} \tag{19c}$$

$$\tau_j = \max_i \left\|\vec{l}_j - \vec{s}_i\right\| \tag{19d}$$

Figure 5:
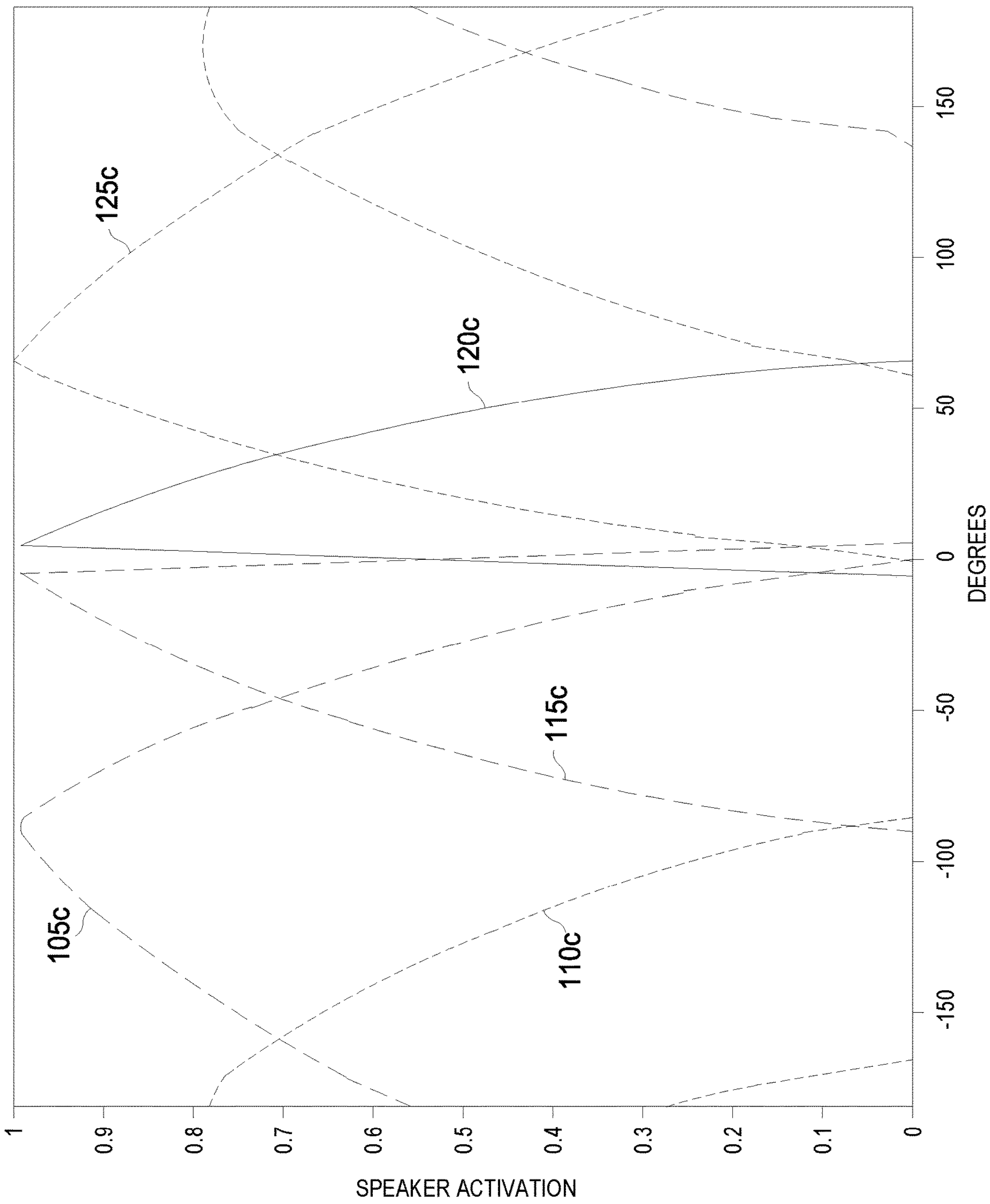
FIG. 5 is a graph of speaker activations in an example embodiment.
Figure 6:
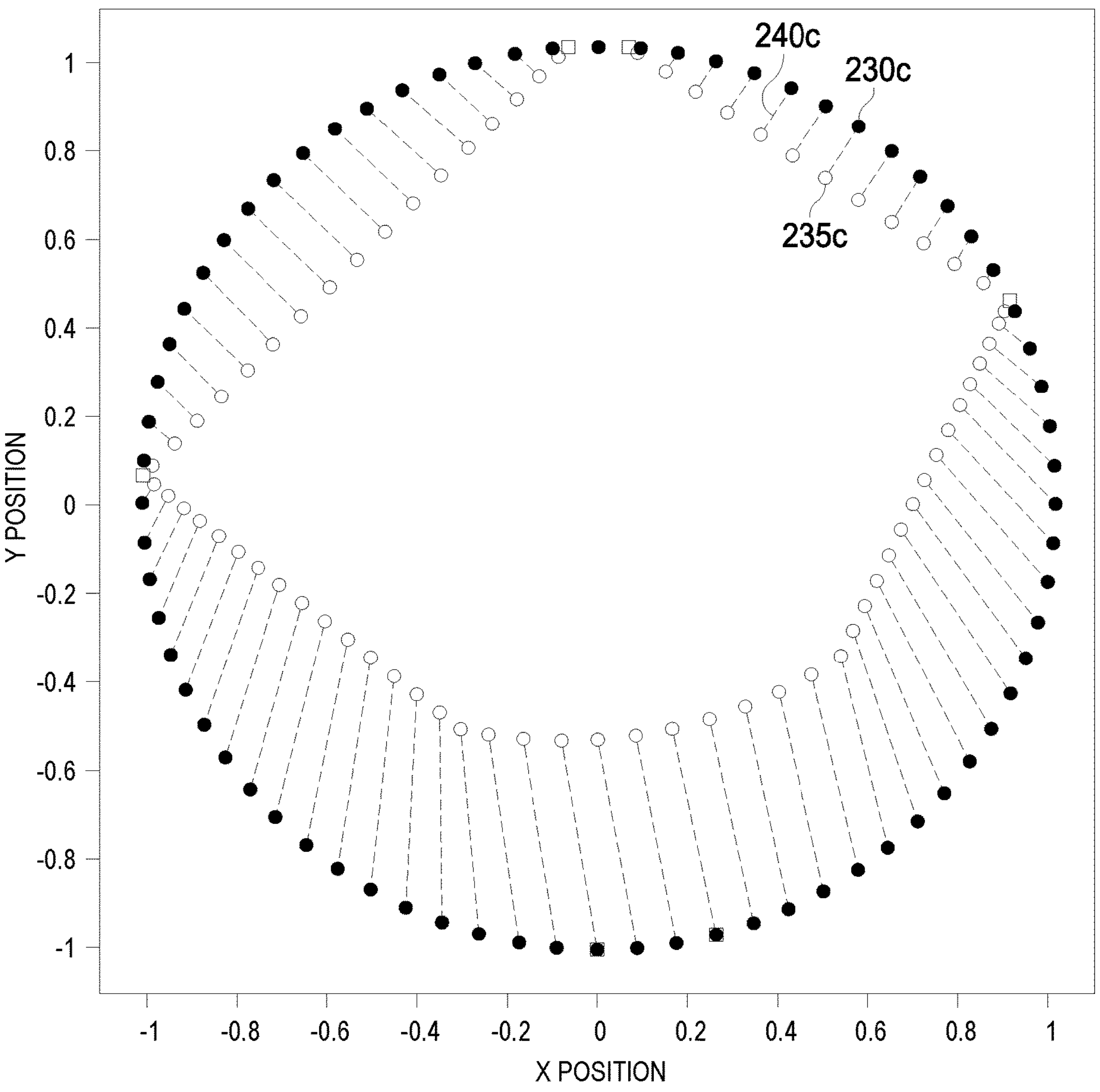
FIG. 6 is a graph of object rendering positions in an example embodiment.

To illustrate the use case of pushing audio away from a listener or talker, we specifically set $\alpha_j$=5, $\beta_j$=2, and $\vec{l}_j$ to a vector corresponding to a listener/talker position of 180 degrees (at the bottom, center of the plot). These values of $\alpha_j$, $\beta_j$, and $\vec{l}_j$ are merely examples. As noted above, in some examples a; may be in the range of 1 to 100 and $\beta_j$ may be in the range of 1 to 25. FIG. 5 is a graph of speaker activations in an example embodiment. According to this example, FIG. 5 shows the speaker activations 105*c*, 110*c*, 115*c*, 120*c* and 125*c*, which comprise the optimal solution to the cost function for the same speaker positions as previous figures, with the addition of the repelling force represented by $w_{ij}$. FIG. 6 is a graph of object rendering positions in an example embodiment. In this example, FIG. 6 shows the ideal object positions 230*c* for a multitude of possible object angles and the corresponding actual rendering positions 235*c* for those objects, connected to the ideal object positions 230*c* by dotted lines 240*c*. The skewed orientation of the actual rendering positions 235*c* away from the fixed position $\vec{l}_j$ illustrates the impact of the repeller weightings on the optimal solution to the cost function.

Figure 7:
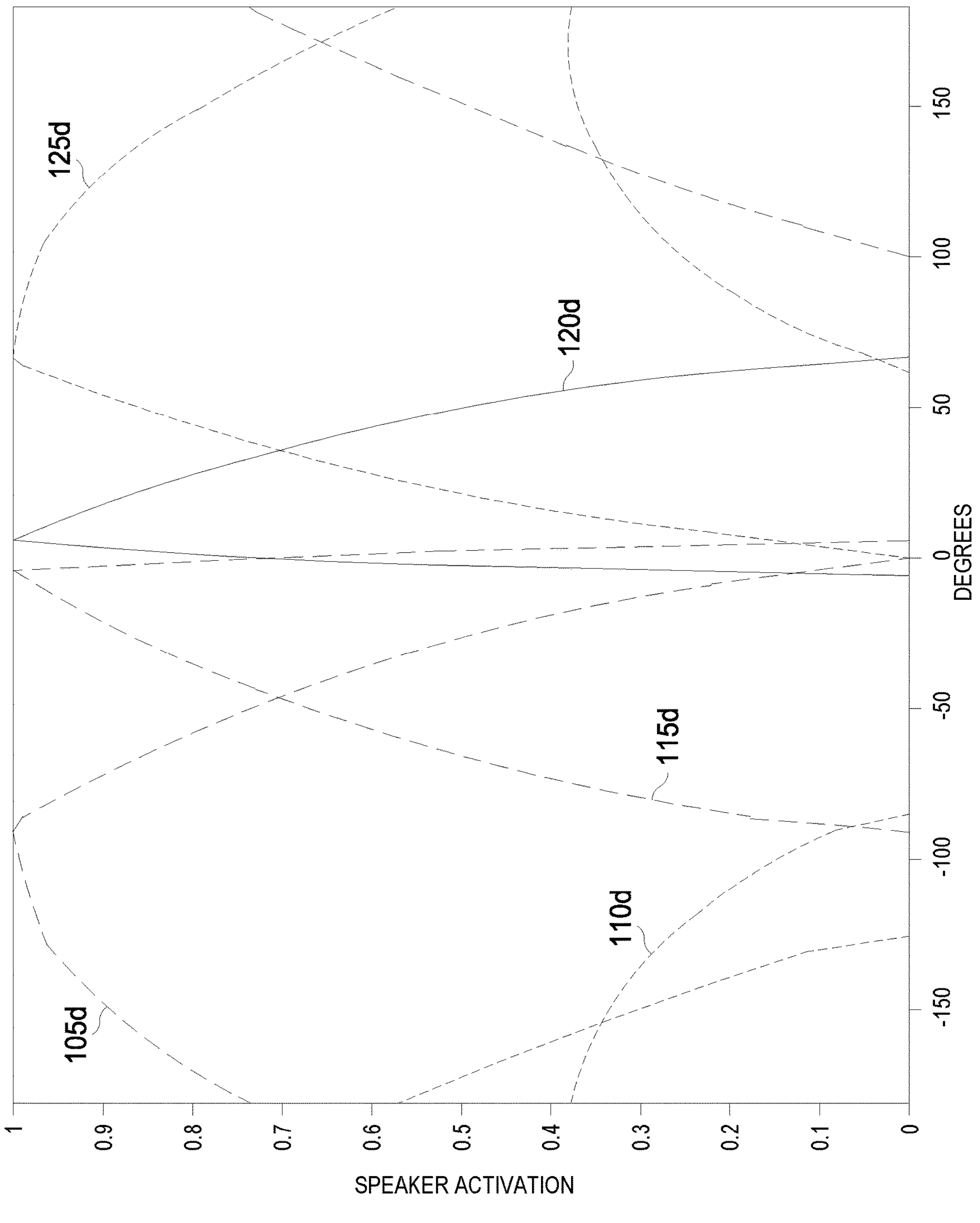
FIG. 7 is a graph of speaker activations in an example embodiment.
Figure 8:
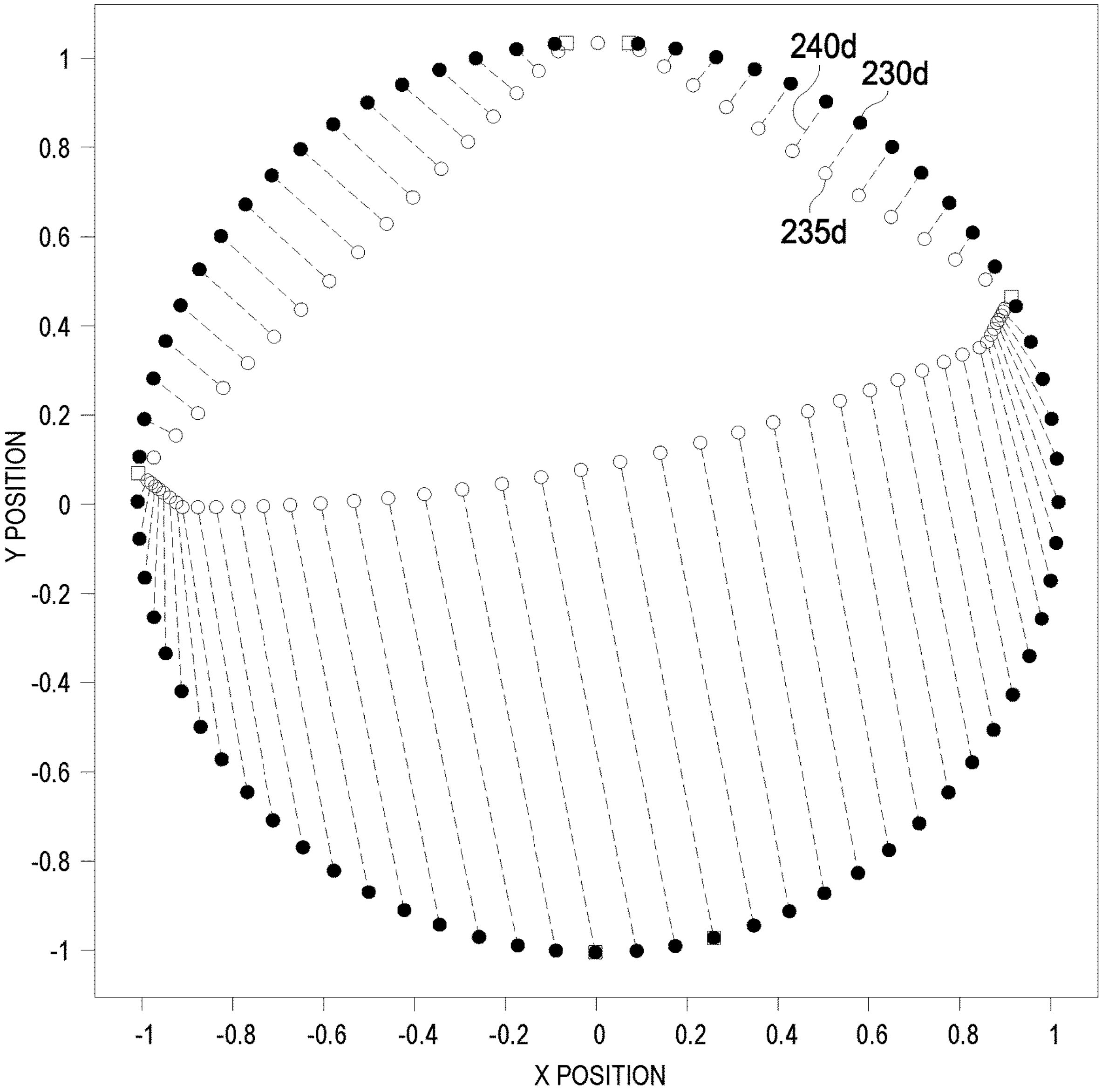
FIG. 8 is a graph of object rendering positions in an example embodiment.

The third example use case is "pushing" audio away from a landmark which is acoustically sensitive, such as a door to a sleeping baby's room. Similarly to the last example, we set $\vec{l}_j$ to a vector corresponding to a door position of 180 degrees (bottom, center of the plot). To achieve a stronger repelling force and skew the soundfield entirely into the front part of the primary listening space, we set $\alpha_j$=20, $\beta_j$=5. FIG. 7 is a graph of speaker activations in an example embodiment. Again, in this example FIG. 7 shows the speaker activations 105*d*, 110*d*, 115*d*, 120*d* and 125*d*, which comprise the optimal solution to the same set of speaker positions with the addition of the stronger repelling force. FIG. 8 is a graph of object rendering positions in an example embodiment. And again, in this example FIG. 8 shows the ideal object positions 230*d* for a multitude of possible object angles and the corresponding actual rendering positions 235*d* for those objects, connected to the ideal object positions 230*d* by dotted lines 240*d*. The skewed orientation of the actual rendering positions 235*d* illustrates the impact of the stronger repeller weightings on the optimal solution to the cost function.

Figure 9:
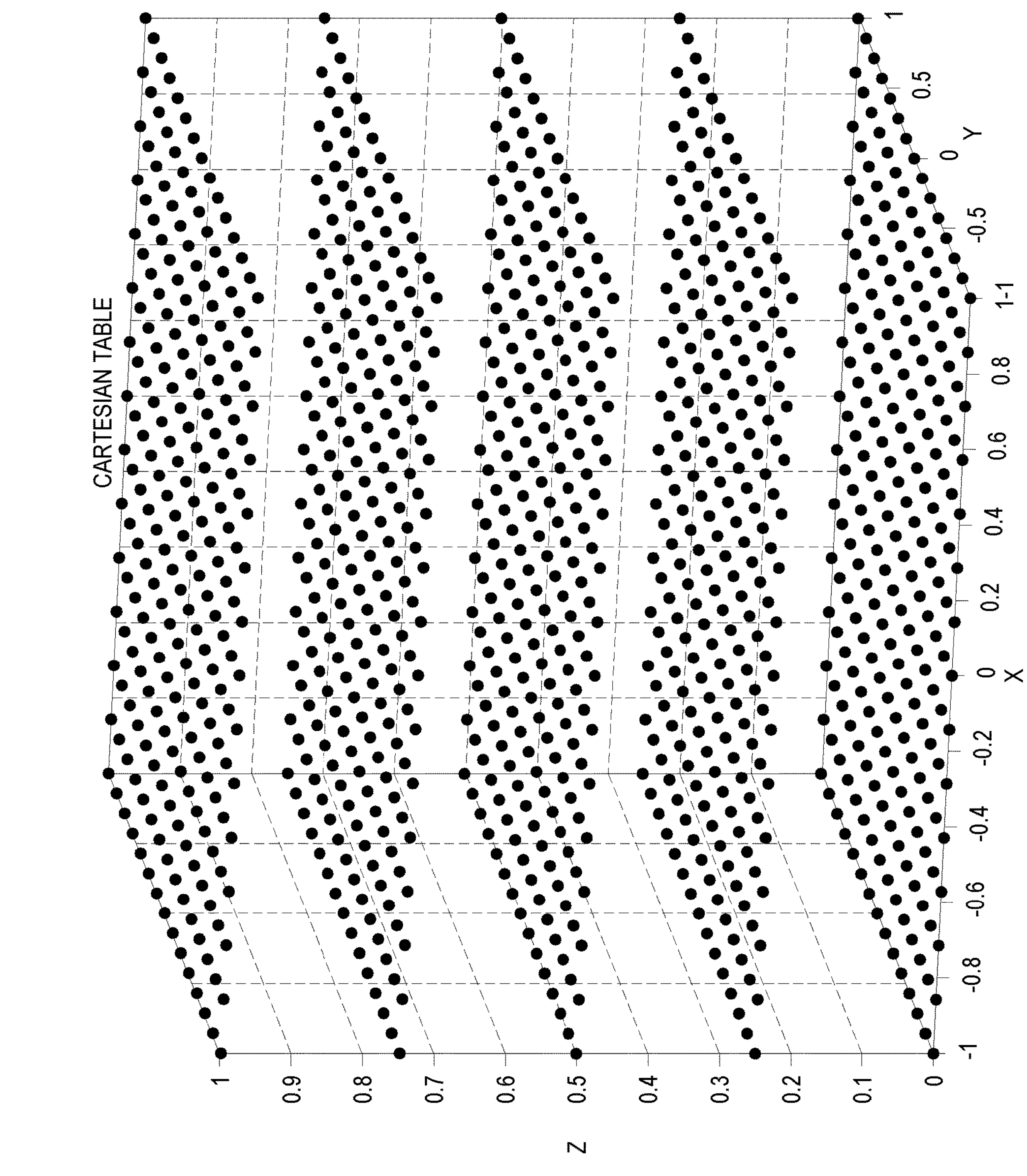
FIG. 9 is a graph of points indicative of speaker activations in an example embodiment.

One of the practical considerations in implementing dynamic cost flexible rendering (in accordance with some embodiments) is complexity. In some cases it may not be feasible to solve the unique cost functions for each frequency band for each audio object in real-time, given that object positions (the positions, which may be indicated by metadata, of each audio object to be rendered) may change many times per second. An alternative approach to reduce complexity at the expense of memory is to use a look-up table that samples the three dimensional space of all possible object positions. The sampling need not be the same in all dimensions. FIG. 9 is a graph of points indicative of speaker activations, in an example embodiment. In this example, the x and y dimensions are sampled with 15 points and the z dimension is sampled with 5 points. Other implementations may include more samples or fewer samples. According to this example, each point represents the M speaker activations for the CMAP or FV solution.

Figure 10:
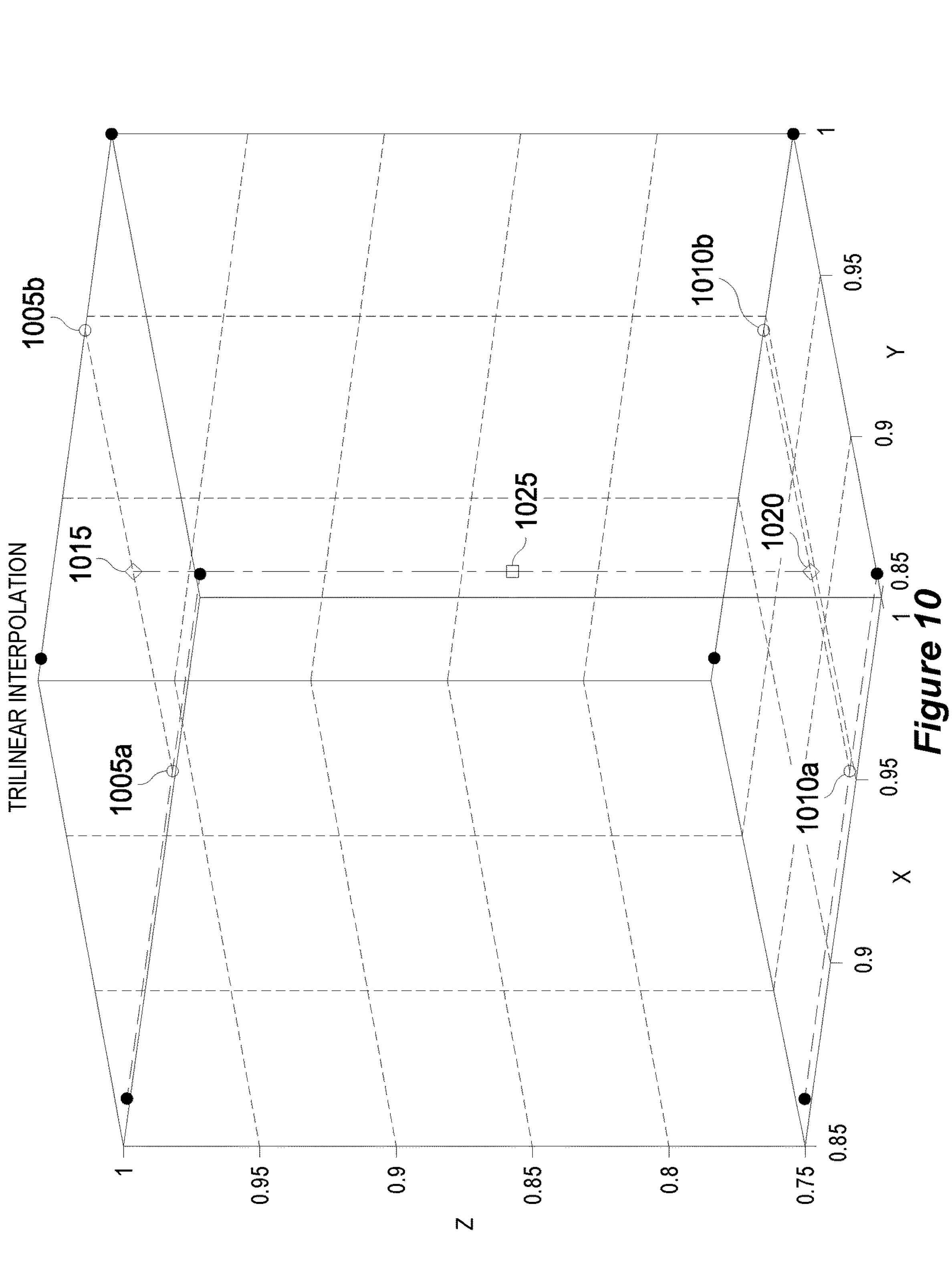
FIG. 10 is a graph of tri-linear interpolation between points indicative of speaker activations according to one example.

At runtime, to determine the actual activations for each speaker, tri-linear interpolation between the speaker activations of the nearest 8 points may be used in some examples. FIG. 10 is a graph of tri-linear interpolation between points indicative of speaker activations according to one example. In this example, the process of successive linear interpolation includes interpolation of each pair of points in the top plane to determine first and second interpolated points

1005*a* and 1005*b*, interpolation of each pair of points in the bottom plane to determine third and fourth interpolated points 1010*a* and 1010*b*, interpolation of the first and second interpolated points 1005*a* and 1005*b* to determine a fifth interpolated point 1015 in the top plane, interpolation of the third and fourth interpolated points 1010*a* and 1010*b* to determine a sixth interpolated point 1020 in the bottom plane, and interpolation of the fifth and sixth interpolated points 1015 and 1020 to determine a seventh interpolated point 1025 between the top and bottom planes. Although tri-linear interpolation is an effective interpolation method, one of skill in the art will appreciate that tri-linear interpolation is just one possible interpolation method that may be used in implementing aspects of the present disclosure, and that other examples may include other interpolation methods.

In the first example above, where a repelling force is being used to create acoustic space for a voice assistant for example, another important concept is the transition from the rendering scene without the repelling force to the scene with the repelling force. To create a smooth transition and give the impression of the soundfield being dynamically warped, both the previous set of speaker activations without the repelling force and a new set of speaker activations with the repelling force are calculated and interpolated between over a period of time.

An example of audio rendering implemented in accordance with an embodiment is: An audio rendering method, comprising:

rendering a set of one or more audio signals, each with an associated desired perceived spatial position, over a set of two or more loudspeakers, where relative activation of the set of loudspeakers is a function of a model of perceived spatial position of said audio signals played back over the loudspeakers, proximity of the desired perceived spatial position of the audio objects to the positions of the loudspeakers, and one or more additional dynamically configurable functions dependent on at least one or more properties of the set of audio signals, one or more properties of the set of loudspeakers, or one or more external inputs.

Next, with reference to FIG. 11, we describe additional examples of embodiments.

FIG. 11 is a diagram of an environment according to one example. In this example, the environment is a living space, which includes a set of smart audio devices (devices 1.1) for audio interaction, speakers (1.3) for audio output, and controllable lights (1.2). In an example, only the devices 1.1 contain microphones and therefore have a sense of where is a user (1.4) who issues a wakeword command. Using various methods, information may be obtained collectively from these devices to provide a positional estimate (e.g., a fine grained positional estimation) of the user who issues (e.g., speaks) the wakeword.

In such a living space there are a set of natural activity zones where a person would be performing a task or activity, or crossing a threshold. These action areas (zones) are where there may be an effort to estimate the location (e.g., to determine an uncertain location) or context of the user to assist with other aspects of the interface. In the FIG. 11 example, the key action areas are:

1. The kitchen sink and food preparation area (in the upper left region of the living space);
2. The refrigerator door (to the right of the sink and food preparation area);
3. The dining area (in the lower left region of the living space);
4. The open area of the living space (to the right of the sink and food preparation area and dining area);
5. The TV couch (at the right of the open area);
6. The TV itself;
7. Tables; and
8. The door area or entry way (in the upper right region of the living space).

In some examples, an area or zone may correspond with all or part of a room in an environment. According to some such examples, an area or zone may correspond with all or part of a bedroom. In one such example, an area or zone may correspond with a baby's entire bedroom or a portion thereof, e.g., an area near a baby's bed.

It is apparent that there are often a similar number of lights with similar positioning to suit action areas. Some or all of the lights may be individually controllable networked agents.

In accordance with some embodiments, audio is rendered (e.g., by one of devices 1.1, or another device of the FIG. 11 system) for playback (in accordance with any embodiment of the disclosed method) by one or more of the speakers 1.3 (and/or speaker(s) of one or more of devices 1.1).

Many embodiments are technologically possible. It will be apparent to those of ordinary skill in the art from the present disclosure how to implement them. Some embodiments of the disclosed system and method are described herein.

FIG. 12 is a block diagram that shows examples of components of an apparatus capable of implementing various aspects of this disclosure. According to some examples, the apparatus 1200 may be, or may include, a smart audio device that is configured for performing at least some of the methods disclosed herein. In other implementations, the apparatus 1200 may be, or may include, another device that is configured for performing at least some of the methods disclosed herein, such as a laptop computer, a cellular telephone, a tablet device, a smart home hub, etc. In some such implementations the apparatus 1200 may be, or may include, a server.

In this example, the apparatus 1200 includes an interface system 1205 and a control system 1210. The interface system 1205 may, in some implementations, be configured for receiving audio program streams. The audio program streams may include audio signals that are scheduled to be reproduced by at least some speakers of the environment. The audio program streams may include spatial data, such as channel data and/or spatial metadata. The interface system 1205 may, in some implementations, be configured for receiving input from one or more microphones in an environment.

The interface system 1205 may include one or more network interfaces and/or one or more external device interfaces (such as one or more universal serial bus (USB) interfaces). According to some implementations, the interface system 1205 may include one or more wireless interfaces. The interface system 1205 may include one or more devices for implementing a user interface, such as one or more microphones, one or more speakers, a display system, a touch sensor system and/or a gesture sensor system. In some examples, the interface system 1205 may include one or more interfaces between the control system 1210 and a memory system, such as the optional memory system 1215 shown in FIG. 12. However, the control system 1210 may include a memory system.

The control system 1210 may, for example, include a general purpose single- or multi-chip processor, a digital signal processor (DSP), an application specific integrated circuit (ASIC), a field programmable gate array (FPGA) or other programmable logic device, discrete gate or transistor logic, and/or discrete hardware components.

In some implementations, the control system 1210 may reside in more than one device. For example, a portion of the control system 1210 may reside in a device within one of the environments depicted herein and another portion of the control system 1210 may reside in a device that is outside the environment, such as a server, a mobile device (e.g., a smartphone or a tablet computer), etc. In other examples, a portion of the control system 1210 may reside in a device within one of the environments depicted herein and another portion of the control system 1210 may reside in one or more other devices of the environment. For example, control system functionality may be distributed across multiple smart audio devices of an environment, or may be shared by an orchestrating device (such as what may be referred to herein as a smart home hub) and one or more other devices of the environment. The interface system 1205 also may, in some such examples, reside in more than one device.

In some implementations, the control system 1210 may be configured for performing, at least in part, the methods disclosed herein. According to some examples, the control system 1210 may be configured for implementing methods of rendering audio over multiple speakers with multiple activation criteria.

Some or all of the methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. The one or more non-transitory media may, for example, reside in the optional memory system 1215 shown in FIG. 12 and/or in the control system 1210. Accordingly, various innovative aspects of the subject matter described in this disclosure can be implemented in one or more non-transitory media having software stored thereon. The software may, for example, include instructions for controlling at least one device to process audio data. The software may, for example, be executable by one or more components of a control system such as the control system 1210 of FIG. 12.

In some examples, the apparatus 1200 may include the optional microphone system 1220 shown in FIG. 12. The optional microphone system 1220 may include one or more microphones. In some implementations, one or more of the microphones may be part of, or associated with, another device, such as a speaker of the speaker system, a smart audio device, etc.

According to some implementations, the apparatus 1200 may include the optional speaker system 1225 shown in FIG. 12. The optional speaker system 1225 may include one or more speakers. In some examples, at least some speakers of the optional speaker system 1225 may be arbitrarily located. For example, at least some speakers of the optional speaker system 1225 may be placed in locations that do not correspond to any standard prescribed speaker layout, such as Dolby 5.1, Dolby 7.1, Hamasaki 22.2, etc. In some such examples, at least some speakers of the optional speaker system 1225 may be placed in locations that are convenient to the space (e.g., in locations where there is space to accommodate the speakers), but not in any standard prescribed speaker layout.

According to some such examples the apparatus 1200 may be, or may include, a smart audio device. In some such implementations the apparatus 1200 may be, or may include, a wakeword detector. For example, the apparatus 1200 may be, or may include, a virtual assistant.

Some disclosed implementations include a system or device configured (e.g., programmed) to perform any embodiment of the disclosed methods, and a tangible computer readable medium (e.g., a disc) which stores code for implementing any embodiment of the disclosed methods or steps thereof. For example, the disclosed system can be or include a programmable general purpose processor, digital signal processor, or microprocessor, programmed with software or firmware and/or otherwise configured to perform any of a variety of operations on data, including an embodiment of the disclosed method or steps thereof. Such a general purpose processor may be or include a computer system including an input device, a memory, and a processing subsystem that is programmed (and/or otherwise configured) to perform an embodiment of the disclosed method (or steps thereof) in response to data asserted thereto.

Some embodiments of the disclosed system are implemented as a configurable (e.g., programmable) digital signal processor (DSP) that is configured (e.g., programmed and otherwise configured) to perform required processing on audio signal(s), including performance of an embodiment of the disclosed method. Alternatively, embodiments of the disclosed system (or elements thereof) are implemented as a general purpose processor (e.g., a personal computer (PC) or other computer system or microprocessor, which may include an input device and a memory) which is programmed with software or firmware and/or otherwise configured to perform any of a variety of operations including an embodiment of the disclosed method. Alternatively, elements of some embodiments of the disclosed system are implemented as a general purpose processor or DSP configured (e.g., programmed) to perform an embodiment of the disclosed method, and the system also includes other elements (e.g., one or more loudspeakers and/or one or more microphones). A general purpose processor configured to perform an embodiment of the disclosed method would typically be coupled to an input device (e.g., a mouse and/or a keyboard), a memory, and a display device.

Another aspect of the present disclosure is a computer readable medium (for example, a disc or other tangible storage medium) which stores code for performing (e.g., coder executable to perform) any disclosed method or steps thereof.

Various features and aspects will be appreciated from the following enumerated example embodiments ("EEEs"):

EEE1. A method for rendering of audio for playback by at least two speakers of at least one of the smart audio devices of a set of smart audio devices, wherein the audio is one or more audio signals, each with an associated desired perceived spatial position, where relative activation of speakers of the set of speakers is a function of a model of perceived spatial position of said audio signals played back over the speakers, proximity of the desired perceived spatial position of the audio signals to positions of the speakers, and one or more additional dynamically configurable functions dependent on at least one or more properties of the audio signals, one or more properties of the set of speakers, or one or more external inputs.

EEE 2. The method of claim EEE1, wherein the additional dynamically configurable functions include at least one of: proximity of speakers to one or more listeners; proximity of speakers to an attracting or repelling force; audibility of the speakers with respect to some location; capability of the speakers; synchronization of the speakers with respect to other speakers; wakeword performance; or echo canceller performance.

EEE 3. The method of claim EEE1 or EEE2, wherein the rendering includes minimization of a cost function, where the cost function includes at least one dynamic speaker activation term.

EEE 4. A method for rendering of audio for playback by at least two speakers of a set of speakers, wherein the audio is one or more audio signals, each with an associated desired perceived spatial position, where relative activation of speakers of the set of speakers is a function of a model of perceived spatial position of said audio signals played back over the speakers, proximity of the desired perceived spatial position of the audio signals to positions of the speakers, and one or more additional dynamically configurable functions dependent on at least one or more properties of the audio signals, one or more properties of the set of speakers, or one or more external inputs.

EEE 5. The method of claim EEE4, wherein the additional dynamically configurable functions include at least one of: proximity of speakers to one or more listeners; proximity of speakers to an attracting or repelling force; audibility of the speakers with respect to some location; capability of the speakers; synchronization of the speakers with respect to other speakers; wakeword performance; or echo canceller performance.

EEE6. The method of claim EEE4 or EEE5, wherein the rendering includes minimization of a cost function, where the cost function includes at least one dynamic speaker activation term.

EEE7. An audio rendering method, comprising:

rendering a set of one or more audio signals, each with an associated desired perceived spatial position, over a set of two or more loudspeakers, where relative activation of the set of loudspeakers is a function of a model of perceived spatial position of said audio signals played back over the loudspeakers, proximity of the desired perceived spatial position of the audio objects to the positions of the loudspeakers, and one or more additional dynamically configurable functions dependent on at least one or more properties of the set of audio signals, one or more properties of the set of loudspeakers, or one or more external inputs.

While specific embodiments and applications have been described herein, it will be apparent to those of ordinary skill in the art that many variations on the embodiments and applications described herein are possible without departing from the scope described and claimed herein. It should be understood that while certain forms have been shown and described, the scope of the present disclosure is not to be limited to the specific embodiments described and shown or the specific methods described.

The invention claimed is:

1. An audio processing method, comprising:

receiving, by a control system and via an interface system, audio data, the audio data including one or more audio signals and associated spatial data, the spatial data indicating an intended perceived spatial position corresponding to an audio signal;

rendering, by the control system, the audio data for reproduction via a set of loudspeakers of an environment, to produce rendered audio signals, wherein rendering each of the one or more audio signals included in the audio data comprises determining activating gains for each loudspeaker of a set of loudspeakers in an environment based, at least on part, on optimizing a cost that is a function of:

a model of perceived spatial position of the audio signal played when played back over the set of loudspeakers in the environment;

a measure of proximity of the intended perceived spatial position of the audio signal to a position of each loudspeaker of the set of loudspeakers; and one or more additional dynamically configurable functions, wherein the one or more additional dynamically configurable functions are based on one or more of: one or more properties of the audio signals; one or more properties of one or more loudspeakers; or one or more external inputs; and providing, via the interface system, the rendered audio signals to at least some loudspeakers of the set of loudspeakers of the environment.

2. The audio processing method of claim 1, wherein the model of perceived spatial position produces a binaural response corresponding to an audio object position at left and right ears of a listener.

3. The audio processing method of claim 1, wherein the model of perceived spatial position places the perceived spatial position of an audio signal playing from a set of loudspeakers at a center of mass of the set of loudspeakers' positions weighted by the loudspeaker's associated activating gains.

4. The audio processing method of claim 3, wherein the model of perceived spatial position also produces a binaural response corresponding to an audio object position at left and right ears of a listener.

5. The audio processing method of claim 1, wherein the one or more additional dynamically configurable functions are based, at least in part, on a level of the one or more audio signals.

6. The audio processing method of claim 1, wherein the one or more additional dynamically configurable functions are based, at least in part, on a spectrum of the one or more audio signals.

7. The audio processing method of claim 1, wherein the one or more additional dynamically configurable functions are based, at least in part, on a location of each of the loudspeakers in the environment.

8. The audio processing method of claim 1, wherein the one or more properties of one or more loudspeakers one or more of frequency response, playback level limits or parameters of one or more loudspeaker dynamics processing algorithms.

9. The audio processing method of claim 1, wherein the one or more additional dynamically configurable functions are based, at least in part, on a measurement or estimate of acoustic transmission from each loudspeaker to other loudspeakers.

10. The audio processing method of claim 1, wherein the one or more additional dynamically configurable functions are based, at least in part, on a location or locations of one or more people in the environment.

11. The audio processing method of claim 10, wherein the one or more additional dynamically configurable functions are based, at least in part, on a measurement or estimate of acoustic transmission from each loudspeaker to the location or locations of the one or more people.

12. The audio processing method of claim 1, wherein the one or more additional dynamically configurable functions are based, at least in part, on an object location of one or more non-loudspeaker objects in the environment.

13. The audio processing method of claim 12, wherein the one or more additional dynamically configurable functions are based, at least in part, on a measurement or estimate of acoustic transmission from each loudspeaker to the object location.

14. The audio processing method of claim 1, wherein the one or more additional dynamically configurable functions are based, at least in part, on an estimate of acoustic transmission from each speaker to one or more landmarks, areas or zones of the environment.

15. The audio processing method of claim 1, wherein the intended perceived spatial position corresponds to at least one of a channel of a channel-based audio format or positional metadata.

16. The audio processing method of claim 1, wherein the one or more external inputs include one or more of: one or more listener or talker locations in the environment; a measurement or estimate of acoustic transmission from each loudspeaker to a listening location; a measurement or estimate of acoustic transmission from a talker to the set of loudspeakers; an environment location other than a talker location, a listener location or a loudspeaker location within the environment; a measurement or estimate of acoustic transmission from each loudspeaker to the environment location; or combinations thereof.

17. One or more non-transitory media having instructions stored thereon for controlling one or more devices to perform an audio processing method, the audio processing method comprising:

receiving, by a control system and via an interface system, audio data, the audio data including one or more audio signals and associated spatial data, the spatial data indicating an intended perceived spatial position corresponding to an audio signal;

rendering, by the control system, the audio data for reproduction via a set of loudspeakers of an environment, to produce rendered audio signals, wherein rendering each of the one or more audio signals included in the audio data comprises determining activating gains for each loudspeaker of a set of loudspeakers in an environment based, at least on part, on optimizing a cost that is a function of:

a model of perceived spatial position of the audio signal played when played back over the set of loudspeakers in the environment;

a measure of proximity of the intended perceived spatial position of the audio signal to a position of each loudspeaker of the set of loudspeakers; and one or more additional dynamically configurable functions, wherein the one or more additional dynamically configurable functions are based on one or more of: one or more properties of the audio signals; one or more properties of one or more loudspeakers; or one or more external inputs; and providing, via the interface system, the rendered audio signals to at least some loudspeakers of the set of loudspeakers of the environment.

18. An apparatus, comprising:

an interface system; and a control system configured to:

receive, via the interface system, audio data, the audio data including one or more audio signals and associated spatial data, the spatial data indicating an intended perceived spatial position corresponding to an audio signal;

render the audio data for reproduction via a set of loudspeakers of an environment, to produce rendered audio signals, wherein rendering each of the one or more audio signals included in the audio data comprises determining activating gains for each loudspeaker of a set of loudspeakers in an environment based, at least on part, on optimizing a cost that is a function of:

a model of perceived spatial position of the audio signal played when played back over the set of loudspeakers in the environment;

a measure of proximity of the intended perceived spatial position of the audio signal to a position of each loudspeaker of the set of loudspeakers; and one or more additional dynamically configurable functions, wherein the one or more additional dynamically configurable functions are based on one or more of: one or more properties of the audio signals; one or more properties of one or more loudspeakers; or one or more external inputs; and provide, via the interface system, the rendered audio signals to at least some loudspeakers of the set of loudspeakers of the environment.

19. The apparatus of claim 18, wherein the one or more additional dynamically configurable functions are based, at least in part, on a location or locations of one or more people in the environment.

* * * * *